US008056065B2

(12) United States Patent
Eichenberger et al.

(10) Patent No.: US 8,056,065 B2
(45) Date of Patent: Nov. 8, 2011

(54) STABLE TRANSITIONS IN THE PRESENCE OF CONDITIONALS FOR AN ADVANCED DUAL-REPRESENTATION POLYHEDRAL LOOP TRANSFORMATION FRAMEWORK

(75) Inventors: Alexandre E. Eichenberger, Chappaqua, NY (US); John K. P. O'Brien, South Salem, NY (US); Kathryn M. O'Brien, South Salem, NY (US); Nicolas T. Vasilache, Ridgewood, NJ (US)

(73) Assignee: International Business Machines Corporation, Armonk, NY (US)

( * ) Notice: Subject to any disclaimer, the term of this patent is extended or adjusted under 35 U.S.C. 154(b) by 1074 days.

(21) Appl. No.: 11/861,512

(22) Filed: Sep. 26, 2007

(65) Prior Publication Data

US 2009/0083722 A1 Mar. 26, 2009

(51) Int. Cl.
*G06F 9/45* (2006.01)
(52) U.S. Cl. .................. 717/151; 717/154; 717/156
(58) Field of Classification Search .............. None
See application file for complete search history.

(56) References Cited

U.S. PATENT DOCUMENTS

| 4,802,091 A | 1/1989 | Cocke et al. |
| 5,287,510 A | 2/1994 | Hall et al. |
| 5,293,631 A | 3/1994 | Rau et al. |
| 5,808,915 A | 9/1998 | Troyanovsky |
| 5,881,291 A | 3/1999 | Piazza |
| 5,946,484 A | 8/1999 | Brandes |
| 5,999,737 A | 12/1999 | Srivastava |
| 6,026,240 A | 2/2000 | Subramanian |
| 6,038,398 A | 3/2000 | Schooler |
| 6,058,266 A | 5/2000 | Megiddo et al. |
| 6,064,819 A * | 5/2000 | Franssen et al. ............. 717/156 |
| 6,078,745 A * | 6/2000 | De Greef et al. ............ 717/151 |
| 6,226,790 B1 | 5/2001 | Wolf et al. |
| 6,247,173 B1 | 6/2001 | Subrahmanyam |
| 6,253,373 B1 | 6/2001 | Peri |
| 6,286,135 B1 | 9/2001 | Santhanam |
| 6,357,041 B1 * | 3/2002 | Pingali et al. ............... 717/154 |
| 6,367,071 B1 | 4/2002 | Cao et al. |
| 6,427,234 B1 | 7/2002 | Chambers et al. |

(Continued)

OTHER PUBLICATIONS

"Optimizing memory usage in the polyhedral model", Quillere et al., Sep. 2000, pp. 773-815, <http://delivery.acm.org/10.1145/370000/365152/p773-quillere.pdf>.*

(Continued)

*Primary Examiner* — Thuy Dao
(74) *Attorney, Agent, or Firm* — Stephen J. Walder, Jr.; Matthew B. Talpis

(57) ABSTRACT

Mechanisms for stable transitions in the presence of conditionals for an advanced dual-representation polyhedral loop transformation framework are provided. The mechanisms of the illustrative embodiments address the weaknesses of the known polyhedral loop transformation based approaches by providing mechanisms for performing code generation transformations on individual statement instances in an intermediate representation generated by the polyhedral loop transformation optimization of the source code. These code generation transformations have the important property that they do not change program order of the statements in the intermediate representation. This property allows the result of the code generation transformations to be provided back to the polyhedral loop transformation mechanisms in a program statement view, via a new re-entrance path of the illustrative embodiments, for additional optimization. In addition, mechanisms are provided for ensuring code stabilization in the presence of conditions such that code bloat is not encountered during re-entrance.

20 Claims, 24 Drawing Sheets

U.S. PATENT DOCUMENTS

| | | | |
|---|---|---|---|
| 6,588,009 | B1 | 7/2003 | Guffens et al. |
| 6,651,246 | B1 | 11/2003 | Archambault et al. |
| 6,654,952 | B1 | 11/2003 | Nair et al. |
| 6,745,384 | B1* | 6/2004 | Biggerstaff ............... 717/156 |
| 6,772,415 | B1 | 8/2004 | Danckaert et al. |
| 6,948,160 | B2 | 9/2005 | Click et al. |
| 6,952,821 | B2 | 10/2005 | Schreiber |
| 7,107,199 | B2 | 9/2006 | Schreiber et al. |
| 7,254,679 | B2 | 8/2007 | Richter et al. |
| 7,484,079 | B2 | 1/2009 | Gupta et al. |
| 2001/0032332 | A1 | 10/2001 | Ward et al. |
| 2004/0003386 | A1 | 1/2004 | Tal |
| 2004/0068718 | A1* | 4/2004 | Cronquist et al. ............ 717/151 |
| 2005/0273770 | A1 | 12/2005 | Eichenberger et al. |
| 2007/0174829 | A1* | 7/2007 | Brockmeyer et al. ......... 717/151 |
| 2008/0263530 | A1 | 10/2008 | Rahavan et al. |
| 2009/0083702 | A1 | 3/2009 | Eichenberger et al. |
| 2009/0083724 | A1 | 3/2009 | Eichenberger et al. |
| 2009/0307673 | A1 | 12/2009 | Eichenberger et al. |

OTHER PUBLICATIONS

"Improving memory energy using access pattern classification", Kandemir et al., Nov. 2001, pp. 201-206, <http://delivery.acm.org/10.1145/610000/603136/p201-kandemir.pdf>.*

U.S. Appl. No. 11/861,449, filed Sep. 26, 2007, Eichenberger et al.
U.S. Appl. No. 11/861,493, filed Sep. 26, 2007, Eichenberger et al.
U.S. Appl. No. 11/861,503, filed Sep. 26, 2007, Eichenberger et al.
U.S. Appl. No. 11/861,449, Image File Wrapper printed Apr. 14, 2011, 1 page.
U.S. Appl. No. 11/861,493, Image File Wrapper printed Apr. 14, 2011, 1 page.
U.S. Appl. No. 11/861,503, Image File Wrapper printed Apr. 14, 2011, 1 page.
Bastoul, Cedric, "Code Generation in the Polyhedral Model is Easier than You Think", PACT'13 IEEE International Conference on Parallel Architecture and Compilation Techniques, Juan-les-Pins, Sep. 2004, pp. 7-16.
Bastoul, Cedric et al., "Putting Polyhedral Loop Transformations to Work", Workshop on Languages and Compilers for Parallel Computing (LCPC'03), LNCS, Springer-Verlag, College Station, Texas, Oct. 2003, pp. 23-30.
Devos, Harold et al., "Hardware Generation from the Polyhedral Model", http://escher.elis.ugent.be/publ/Edocs/DOC/P106_165.pdf, 4 pages, 2008.
Girbal, Sylvain et al., "Semi-Automatic Composition of Loop Transformations for Deep Parallelism and Memory Hierarchies", International Journal of Parallel Programming, vol. 34, No. 3, Jun. 2006, pp. 261-317.
Quillere, Fabien et al., "Generation of Efficient Nested Loops from Polyhedra", International Journal of Parallel Programming, Oct. 2000, 30 pages.
Vasilache, Nicolas et al., "Polyhedral Code Generation in the Real World", INRIA, 2006, available at http://hal.inria.fr/inria-00001106/en/, 15 pages.
Vasilache, Nicolas, "Scalable Program Optimization Techniques in the Polyhedral Model", Thesis for Doctor of Philosophy, To Be Defended Sep. 28, 2007, Universite de Paris-SUD, U.F.R. Scientifique d'Orsay, Inria Futurs, 216 pages, published 2007.
Notice of Allowance mailed Jul. 22, 2011 for U.S. Appl. No. 11/861,449; 20 pages.
Office Action mailed May 10, 2011 for U.S. Appl. No. 11/861,493; 16 pages.
Response to Office Action filed with the USPTO on Jun. 29, 2011 for U.S. Appl. No. 11/861,503, 26 pages.
Response to Office Action filed with the USPTO on Aug. 10, 2011 for U.S. Appl. No. 11/861,493, 26 pages.

* cited by examiner

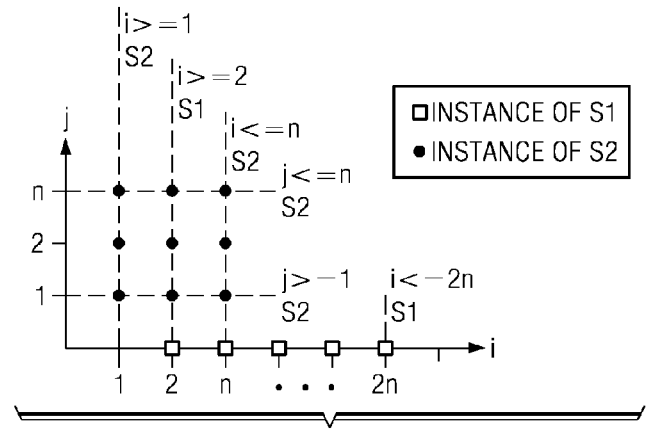
```
for(i=2; i<=n; i++)
  z[i] = 0;                    // S1
for(i=1; i<=n; i++)
  for(j=1; j<=n; j++)
    z[i+j] += x[i] * y[j];     // S2
```
FIG. 1A
(PRIOR ART)
FIG. 1B
(PRIOR ART)
FIG. 1C
(PRIOR ART)
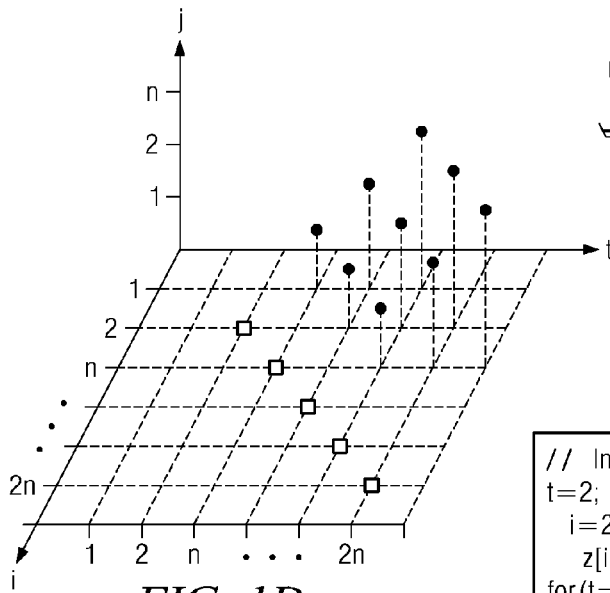
FIG. 1D
(PRIOR ART)
```
//  Indentation follows t,i,j domain dimensions
t=2;   // A loop running once
  i=2;
    z[i] = 0;                              // S1
for(t=3; t<=2*n; t++)
  for(i=max(1,t-n-1) ; i<=min (t-2,n) ; i++)
    j = t-i-1;
      z[i+j]  +=  x[i] * y[j]              // S2
  i=t;
    z[i] = 0;                              // S1
t=2*n+1;
  i=n;
    j=n;
      z[i+j]  +=  x[i] * y[j];             // S2
```
FIG. 2B
(PRIOR ART)

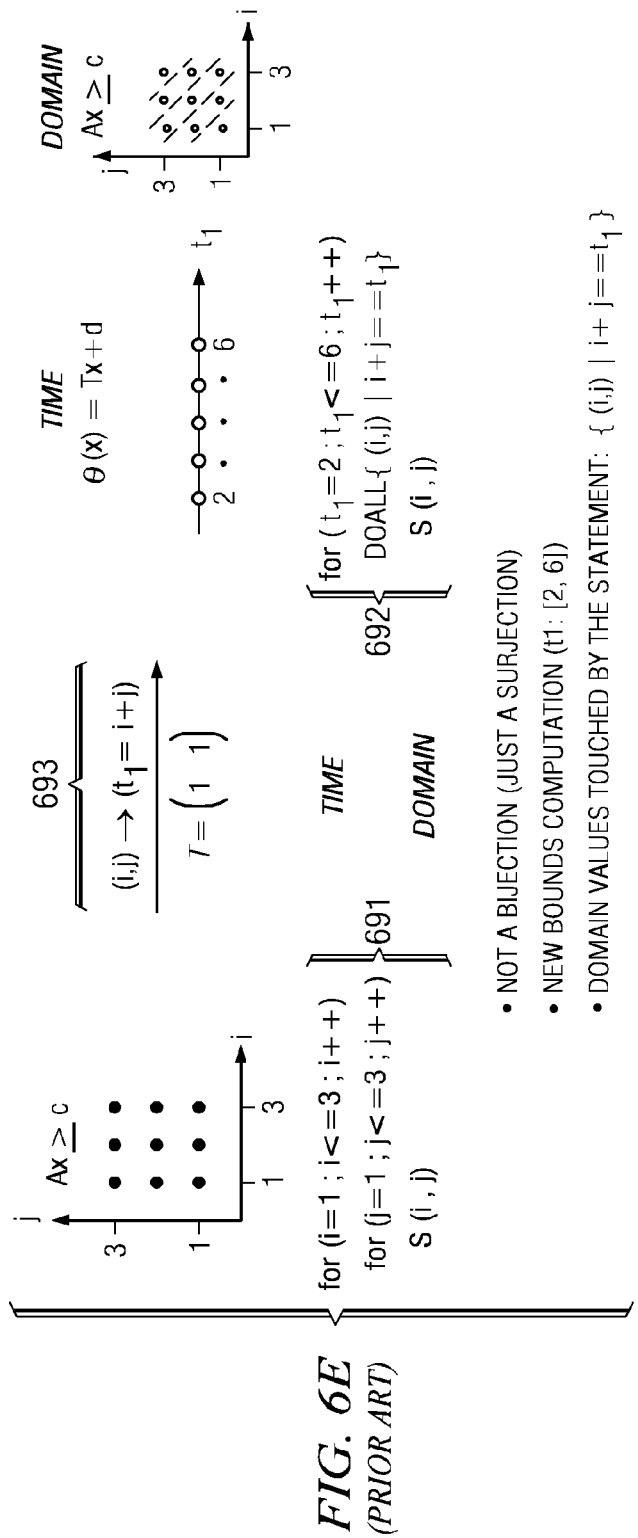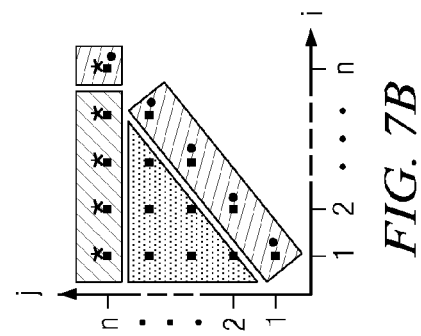
*FIG. 6E (PRIOR ART)*
*FIG. 7A*
*FIG. 7B*

FIG. 6F (PRIOR ART)

DOMAIN
$Ax \geq c$

TIME
$\theta(x) = Tx + d$

697
$(i,j)_1 \rightarrow (t_1 = i, t_2 = j)$
$(i,j)_2 \rightarrow (t_1 = i+1, t_2 = j)$ $T_1 = \begin{pmatrix} 1 & 0 \\ 0 & 1 \end{pmatrix} \quad d_1 \begin{pmatrix} 0 \\ 0 \end{pmatrix}$ $T_2 = \begin{pmatrix} 1 & 0 \\ 0 & 1 \end{pmatrix} \quad d_2 \begin{pmatrix} 1 \\ 0 \end{pmatrix}$ 694
```
for (i=1; i<=3; i++)
 for (j=1; j<=3; j++)
  S_1(i,j)  o
  S_2(i,j)  •
```

695
```
for (t_2=1; t_2<=3; t_2++)
 S_1(i=1, j=t_2)
for (t_1=2; t_1<=3; t_1++)
 for (t_2=1; t_2<=3; t_2++)
  S_1(i=t_1, j=t_2)
  S_2(i=t_1-1, j=t_2)
for (t_2=1; t_2<=3; t_2++)
 S_2(i=4-1, j=t_2)
```

698 696 699

- NEW BOUNDS COMPUTATION ($S_1$: [1,3]X[1,3]  $S_2$: [2,4]X[1,3]) HAVE DISJOINT PARTS
- SEPARATION PHASE NEEDED ON EACH TIME DIMENSION ($3^{nb\_stmt}$ W.C. COMPLEXITY)

```
ApplyCodegenTransformation: applies a transformation on P_IV
Input:
    node: A_ST root node
Output: P_IV after application of the transformation root ← node
    visitor ← new visitor(outer_visitor_type, node)
    while node has successors in traversal
        boolean changed ← false
        currentNode ← node.successor
        if currentNode is marked
1           core_node_list ← apply_core_function(currentNode, changed)
            if changed
                sort core_node_list under parent context
                foreach newNode in core_node_list
2                   newNode.children ← currentNode.children
3                   newNode ← propagate(newNode)
                    if newNode.children size is 0
4                       delete newNode return root
```

*FIG. 11*

```
            for (t_1=1; t_1 ≤ N; t_1++)
                if (t_1 ≡ N)
S1_1                S_1(i=t_1, j=N)
S2_1                S_2(i=t_1, j=N)
S3_1                S_3(i=t_1, j=N)
                if (t_1 ≤ N-1)
S1_2                S_1(i=t_1, j=t_1)
S2_2                S_2(i=t_1, j=t_1)
                    for(t_2=t_1+1;
                        t_2 ≤ N-1; t_2++)
S2_3                    S_2(i=t_1, j=t_2)
                if (t_1 ≤ N-1)
S2_4                S_1(i=t_1, j=N)
S3_2                S_2(i=t_1, j=N)
```

*FIG. 12A*

```
            for (t_1=1; t_1 ≤ N-1; t_1++)
S1_1            S_1(i=t_1, j=t_1)
S2_1            S_2(i=t_1, j=t_1)
                for(t_2=t_1+1;
                    t_2 ≤ N-1; t_2++)
S2_2                S_2(i=t_1, j=t_2)
S2_3            S_2(i=t_1, j=N)
S3_1            S_3(i=t_1, j=N)
S1_2        S_1(i=N, j=N)
S2_4        S_2(i=N, j=N)
S3_2        S_2(i=N, j=N)
```

*FIG. 12B*

ORIGINAL CODE

```
for (i=0;i ≤ N - 1;i++)
 for (j=0;i ≤ N - 1;j++)
  S(i,j)
```

*FIG. 13A*

```
         for (t₁= 1;t₁≤ N - 2;t₁++)
S1₁    |  S₁(i=t₁, j=t₁)
S2₁    |  S₂(i=t₁, j=t₁)
         for(t₂=t₁+1;
              t₂≤ N - 1;t₂++)
S2₂    |  S₂(i=t₁,j = t₂)
S2₃    |  S₂(i=t₁,j = N)
S3₁    |  S₃(i=t₁,j = N)
S1₂    S₁(i=N - 1,j = N -1)
S2₄    S₂(i=N - 1,j = N -1)
S2₅    S₂(i=N - 1,j = N)
S3₂    S₃(i=N - 1,j = N)
S1₃    S₁(i=N,j = N)
S2₆    S₂(i=N,j = N)
S3₃    S₃(i=N,j = N)
```

*FIG. 12C*

SKEWING ON FIRST DIMENSION

```
for (t₁=0;t₁≤ 2N - 2;t₁++)
 for (t₂=max(0,t₁- N + 1);
       t₂≤ min(t₁,N - 1);t₂++)
  S(t₁- t₂,t₂)
```

*FIG. 13B*

AFTER OPTIMIZATION/TRANSFORMATION

```
for (t₁=0;t₁ ≤ N - 2;t₁++)
 for (t₂=0;t₂ ≤ t₁;t₂++)
  S(t₁-t₂,t₂)
for (t₁=N - 1;t₁≤ 2*N - 2;t₁++)
 for (t₂=t₁ - N + 1;t₂ ≤ t₁;t₂++)
  S(t₁-t₂,t₂)
```

*FIG. 13C*

NULL A $$A^{S_1} = [\overset{i}{0}] \quad \beta^{S_1} = \begin{bmatrix} 0 \\ 0 \end{bmatrix}$$

$$A^{S_2} = [\overset{i}{0}] \quad \beta^{S_2} = \begin{bmatrix} 0 \\ 1 \end{bmatrix}$$

NULL A CODE

```
t₀ =0
 #pragma omp parallel
 for (d₁=1 ;d₁ ≤ N ;d₁++)
S₁ |  S₁(i = d₁)
 #pragma omp parallel
 for (d₁=1 ;d₁ ≤ N ;d₁++)
S₂ |  S₂(i = d₁)
```

*FIG. 14A*

GUARDED VERSION OF CODE
```
        for (i-1;i<-N;i++)
        |   if (i<=N-1)
S1.1    |   |   S1 (i,i);
S2.1    |   |   S2 (i,i);
        |   |   for (j-i+1;j<-N-1;j++)
S2.2    |   |   |   S2 (i,j)
S2.3    |   |   S2 (i,N);
S3.1    |   |   S3 (i,N);
        |   if (i==N)
S1.2    |   |   S1 (i,N)
S2.4    |   |   S2 (i,N)
S3.2    |   |   S3 (i,N)
```
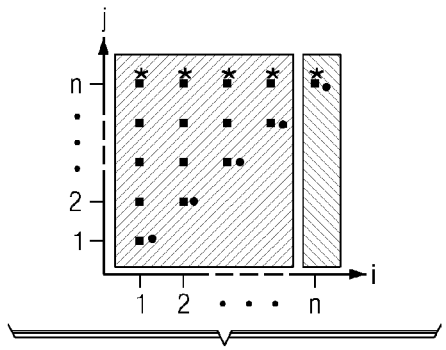
*FIG. 16B*
RESCANNED VERSION OF CODE
```
        for (i-1;i<-N-2;i++)
S1.1    |   S1 (i,i);
S2.1    |   S2 (i,i);
        |   for (j=i+1;j<=N-1;j++)
S2.2    |   |   S2 (i,j)
S2.3    |   S2 (i,N);
S3.1    |   S3 (i,N);
        if  (1<=N-1)
S1.2    |   S1 (i,N-1)
S2.4    |   S2 (i,N-1)
S2.5    |   S2 (i,N-1)
S3.2    |   S3 (i,N-1)
        if  (1<-N)
S1.3    |   S1 (i,N)
S2.6    |   S2 (i,N)
S3.3    |   S3 (i,N)
```
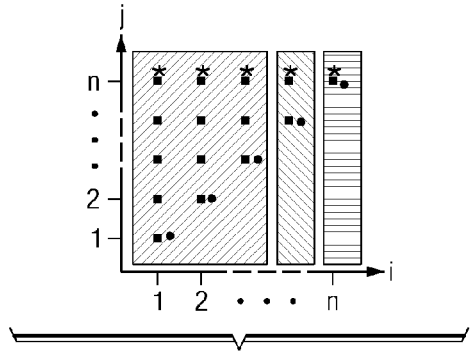
*FIG. 16C*
ORIGINAL COMPLEX SCHEDULE
```
        for (t_1=1;t_1≤ 3M - 7;t_1+=1)
        |   for (t_2=(t_1 + 4) /3;t_2 ≤ (t_1 + 6) /3;t_2+=1)
        |   ...
        |   if (t_1 % 3 ≡ 0)
S_1     |   |   S_1 (t_2, t_1/3);
        |   if (t_1 % 3 ≡ 2)
S_1     |   |   S_2 ((t_1 +1) /3, t_2);
        |   ...
```
*FIG. 17A*

AFTER REGENERATION WITHOUT STRETCHING

```
         for (t₁=5;t₁ ≤ 3M - 9;t₁+=1)
           ...
           if(-t₁ + 3M ≡ 9 && M ≥ 5)
             if (t₁ % 3 ≡ 0)
S1₁            S₁ (M - 2, t₁/3);
           ...
             if (t₁ % 3 ≡ 0)
               t₂=(t₁ + 3)/3;
               if (t₂ ≥ 3 && t₂ ≤ M - 3)
                 if (t₁ % 3 ≡ 0)
S1₂                S₁ (t₂, t₁/3);
           if (t₁ ≤ 3M - 10)
             for (t₂=(t₁ + 4) /3;t₂ ≤ (t₁ + 6) /3;t₂+=1)
               if (t₁ % 3 ≡ 0)
S1₃              S₁ (t₂, t₁/3);
               if (t₁ % 3 ≡ 2)
S2₁              S₂((t₁ +1) /3, t₂);
           ...
           if  (-t₁ + 3M ≡ 9 && M ≥ 5)
             for (t₂=M - 1;t₂ ≤ M ;t₂+=1)
               if (t₁ % 3 ≡ 0)
S1₄              S₁ (t₂, t₁/3);
               if (t₁ % 3 ≡ 2)
           ...
S2₂              S₂((t₁ +1) /3, t₂);
```

FIG. 17B

AFTER REGENERATION WITH STRETCHING

```
         for (t₁=1;t₁ ≤ 3M - 7;t₁+=1)
           for (t₂=(t₁ + 4) /3;t₂ ≤ (t₁ + 6) /3;t₂+=1)
             ...
             if (t₁ % 3 ≡ 0)
S₁             S₁ (t₂, t₁/3);
             if (t₁ % 3 ≡ 2)
S₁             S₂((t₁ +1) /3, t₂);
             ...
```

FIG. 17C

ORIGINAL PROGRAM $\mathcal{P}$
$$\begin{cases} A^{S_1}=[\overset{i}{3}] & \beta^{S_1}=\begin{bmatrix}0\\0\end{bmatrix} & \Gamma^{S_1}=[\cdot\overset{N}{|}\cdot\overset{1}{|}\cdot] & \mathfrak{D}^{S_1}=\begin{bmatrix}\overset{i}{1}&\overset{N}{|}\cdot&\overset{1}{|}-1\\-1&|1&|\cdot\end{bmatrix} \\ A^{S_2}=[\overset{i}{3}] & \beta^{S_2}=\begin{bmatrix}0\\1\end{bmatrix} & \Gamma^{S_2}=[\cdot\overset{N}{|}5] & \mathfrak{D}^{S_2}=\begin{bmatrix}\overset{i}{1}&\overset{N}{|}\cdot&\overset{1}{|}-1\\-1&|1&|\cdot\end{bmatrix} \end{cases}$$

*FIG. 18A*

SCATTER AT FIRST GENERATION $$\dot{\Theta}^{S_1}=\begin{bmatrix}\overset{t_1}{1}&\overset{N}{|}\cdot&\overset{1}{|}-3\\-1&|3&|\cdot\end{bmatrix}$$

$$\dot{\Theta}^{S_2}=\begin{bmatrix}\overset{t_1}{1}&\overset{N}{|}\cdot&\overset{1}{|}-8\\-1&|3&|5\end{bmatrix}$$

*FIG. 18B*

$A^{\mathcal{P}}_{ST}$ AFTER FIRST GENERATION

```
         for (t₁=3;t₁ ≤ 7;t₁++)
           if(t₁%3≡0)
S1₁        | S₁(i =t₁/3)
         for (t₁=8;t₁ ≤ 3N;t₁++)
           if(t₁%3≡0)
S1₂        | S₁(i =t₁/3)
           if(t₁%3 ≡ 2)
S2₁        | S₂(i = (t₁ - 5)/3)
         for (t₁=3N + 1;t₁ ≤ 3N + 5;t₁++)
           if(t₁%3≡2)
S2₂        | S₂(i = (t₁ - 5)/3)
```

*FIG. 18C*

REGENERATED PROGRAM $\mathcal{P}'$
$$\begin{cases} A^{S_{1_1}}=[\overset{i}{3}] & \beta^{S_{1_1}}=\begin{bmatrix}0\\0\end{bmatrix} & \Gamma^{S_{1_1}}=[\cdot\overset{N}{|}\cdot\overset{1}{|}\cdot] & \mathfrak{D}^{S_{1_1}}=\begin{bmatrix}\overset{i}{1}&\overset{N}{|}\cdot&\overset{1}{|}-1\\-1&|\cdot&|2\end{bmatrix} \\ A^{S_{1_2}}=[\overset{i}{3}] & \beta^{S_{1_2}}=\begin{bmatrix}0\\1\end{bmatrix} & \Gamma^{S_{1_2}}=[\cdot\overset{N}{|}\cdot\overset{1}{|}\cdot] & \mathfrak{D}^{S_{1_2}}=\begin{bmatrix}\overset{i}{1}&\overset{N}{|}\cdot&\overset{1}{|}3\\-1&|1&|\cdot\end{bmatrix} \\ A^{S_{2_1}}=[\overset{i}{3}] & \beta^{S_{2_1}}=\begin{bmatrix}0\\1\end{bmatrix} & \Gamma^{S_{2_1}}=[\cdot\overset{N}{|}5] & \mathfrak{D}^{S_{2_1}}=\begin{bmatrix}\overset{i}{1}&\overset{N}{|}\cdot&\overset{1}{|}-1\\-1&|1&|-2\end{bmatrix} \\ A^{S_{2_2}}=[\overset{i}{3}] & \beta^{S_{2_2}}=\begin{bmatrix}0\\2\end{bmatrix} & \Gamma^{S_{2_2}}=[\cdot\overset{N}{|}5] & \mathfrak{D}^{S_{2_2}}=\begin{bmatrix}\overset{i}{1}&\overset{N}{|}1&\overset{1}{|}-1\\-1&|1&|\cdot\end{bmatrix} \end{cases}$$

*FIG. 18D*

SCATTER AT SECOND GENERATION
WITHOUT STRETCHING $$\vec{c}S_{1_2} = \begin{bmatrix} t_1 & N & 1 \\ 1 & \cdot & -9 \\ -1 & 3 & \cdot \end{bmatrix}$$

$$\vec{c}S_{2_1} = \begin{bmatrix} t_1 & N & 1 \\ 1 & \cdot & -8 \\ -1 & 3 & -1 \end{bmatrix}$$

*FIG. 18E*

UNSTABLE $A_{ST}^{P'}$ AT SECOND
GENERATION WITHOUT STRETCHING

```
         for (t₁=3;t₁ ≤ 6;t₁++)
            if(t₁%3≡0)
S₁₁          S₁ (i =t₁/3)
         t₁=8;
            if(t₁%3≡2)
S₂₁          S₂(i = (t₁ - 5)/3)
         for (t₁=9;t₁ ≤ 3N - 1;t₁++)
            if(t₁%3≡0)
S₁₂          S₁ (i = t₁/3)
            if(t₁%3≡2)
S₂₂          S₂(i = (t₁ - 5)/3)
         t₁=3N;
            if(t₁%3≡0)
S₁₃          S₁ (i = t₁/3)
         for (t₁=3N + 2;t₁ ≤ 3N + 5;t₁++)
            if(t₁%3≡2)
S₂₃          S₂(i = (t₁ - 5)/3)
```

*FIG. 18F*

SCATTER AT SECOND
GENERATION WITH STRETCHING $$\vec{c}S_{1_2} = \begin{bmatrix} t_1 & N & 1 \\ 1 & \cdot & -6 \\ -1 & 3 & 2 \end{bmatrix}$$

$$\vec{c}S_{2_1} = \begin{bmatrix} t_1 & N & 1 \\ 1 & \cdot & -6 \\ -1 & 3 & 2 \end{bmatrix}$$

*FIG. 19A*

STABLE $A_{ST}^{P'}$ AT SECOND
GENERATION WITH STRETCHING

```
         for (t₁=1;t₁ ≤ 5;t₁++)
            if(t₁%3≡0)
S₁₁          S₁ (i =t₁/3)
         for (t₁=6;t₁ ≤ 3N + 2;t₁++)
            if(t₁%3≡0)
S₁₂          S₁ (i =t₁/3)
            if(t₁%3 ≡ 2)
S₂₂          S₂(i = (t₁ - 5)/3)
         for (t₁=3N + 3;t₁ ≤ 3N + 7;t₁++)
            if(t₁%3≡2)
S₂₃          S₂(i = (t₁ - 5)/3)
```

*FIG. 19B*

$$\text{ORIGINAL, ILL BEHAVED PROGRAM } \mathcal{P} \begin{cases} A^{S_1} = \overset{i}{[3]} & \beta^{S_1} = \begin{bmatrix} 0 \\ 0 \end{bmatrix} & \Gamma^{S_1} = \overset{N\ \ 1}{[1\,|\,\text{-}2]} & \mathcal{D}_{om}^{S_1} = \begin{bmatrix} \overset{i}{1} & \overset{N}{\cdot} & \overset{1}{\text{-}1} \\ \text{-}1 & 1 & \cdot \end{bmatrix} \\ A^{S_2} = \overset{i}{[3]} & \beta^{S_2} = \begin{bmatrix} 0 \\ 1 \end{bmatrix} & \Gamma^{S_2} = \overset{N\ \ 1}{[2\,|\,5]} & \mathcal{D}_{om}^{S_2} = \begin{bmatrix} \overset{i}{1} & \overset{N}{\cdot} & \overset{1}{\text{-}1} \\ \text{-}1 & 1 & \cdot \end{bmatrix} \end{cases}$$

*FIG. 20A*

$A_{ST}^{\mathcal{P}}$ AFTER FIRST GENERATION

```
         for (t₁=N ;t₁ ≤ 2N + 7;t₁++)
           if((t₁- N)%3 ≡ 1)
S₁ ₁     |  S₁ (i = (t₁ - N + 2)/3)
         for (t₁=2N + 8;t₁ ≤ 4N - 2;t₁++)
           if((t₁- N)%3 ≡ 1)
S₁ ₂     |  S₁ (i = (t₁ - N + 2)/3)
           if((t₁- 2N)%3 ≡ 1)
S₂ ₁     |  S₂ (i = (t₁ - 2N - 5)/3)
         for (t₁=4N - 1;t₁ ≤ 5N + 5;t₁++)
           if((t₁- 2N)%3 ≡ 1)
S₂ ₂     |  S₂ (i = (t₁ - 2N - 5)/3)
```

*FIG. 20B*

$A_{ST}^{\mathcal{P}'}$ AFTER SECOND GENERATION

```
         for (t₁=N ;t₁ ≤ 2N + 7;t₁++)
           if((t₁- N)%3 ≡ 1)
S₁ ₁     |  S₁ (i = (t₁ - N + 2)/3)
         for (t₁=2N + 8;t₁ ≤ 4N - 2;t₁++)
           if((t₁- N)%3 ≡ 1)
S₁ ₂     |  S₁ (i = (t₁ - N + 2)/3)
           if((t₁- 2N)%3 ≡ 1)
S₂ ₁     |  S₂ (i = (t₁ - 2N - 5)/3)
         for (t₁=4N - 1;t₁ ≤ 5N + 5;t₁++)
           if((t₁- 2N)%3 ≡ 1)
S₂ ₂     |  S₂ (i = (t₁ - 2N - 5)/3)
```

*FIG. 20C*

STABLE TRANSITIONS IN THE PRESENCE OF CONDITIONALS FOR AN ADVANCED DUAL-REPRESENTATION POLYHEDRAL LOOP TRANSFORMATION FRAMEWORK

GOVERNMENT RIGHTS

This invention was made with Government support under the Defense Advanced Research Projects Agency (DARPA), HR0011-07-9-0002. THE GOVERNMENT HAS CERTAIN RIGHTS IN THIS INVENTION.

BACKGROUND

1. Technical Field

The present application relates generally to an improved data processing system and method. More specifically, the present application is directed to a system and method for stable transitions in the presence of conditionals for an advanced dual representation polyhedral loop transformation framework.

2. Description of Related Art

Generating computer code that is efficiently processed (i.e., "optimized") is one of the most important goals in software design and execution. Computer code which performs the desired function accurately and reliably but too slowly (i.e., code which is not optimized) is often discarded or unused by computer users.

As those of ordinary skill in the art are aware, most source code (i.e., that code which is a human readable form) is typically converted into object code, and thereafter an executable application, by use of a compiler and a linker. The executable application is in a form and language that is machine readable (i.e., capable of being interpreted and executed by a computer). Other languages, such as Java available from Sun Microsystems, Inc. of California, USA, may be in source code form that is, on execution, transformed into a form understood by a computer system which then executes the transformed instructions. In any case, the source code, when transformed into a form capable of being understood and executed by a computer system, is frequently optimized. That is, a transformation is performed such that the instructions are performed more efficiently (i.e., optimized) and, hopefully, without any undue delay.

One common structure found in source code that is optimized, during the compilation process to transform source code into executable code, is the loop. Loops are used to repeat one or more operations or instructions. Loops may be provided as single, non-nested loops, or nested loops, i.e. loops within loops. For example, an array may be used to store the purchase price of individual articles (e.g., where the $i^{th}$ element in the array A is denoted, in Fortran, as A(i)—other similar notations are used in other languages) generate a single instruction to add each of the purchase prices together (e.g., sum=A(1)+A(2)+ . . . +A(n)). This however would take the programmer some time to code and is not easily adapted to the situation where the computer programmer does not know, at development time, the number of articles in the array. That is, when the number of elements in the array can only be determined at run time (i.e., during execution). Accordingly, the loop was developed to repeat an operation (e.g., sum=sum+A(i))) where the induction variable, i, is changed for each iteration. Other forms of loops are known and are equally applicable.

However, when the instructions of a loop are transformed into machine readable code (e.g., executable code), the executed instructions may not be processed efficiently. For the example above, some computer systems may require that the processor fetch from memory, rather than from a register or cache memory, the various elements of the array "A". Fetching data from memory requires the processor to wait while the data is retrieved thereby increasing the latency of the program execution. Also, while loops may be an efficient way to write certain repetitive source code operations, a loop does insert additional operations that would not be present if the repetitive operations were replicated. These additional operations (e.g., branching operations) are considered to be the loop "overhead".

To address some of the inefficiencies in processing loops, various optimization techniques have been created and applied. Examples of these various optimization techniques include loop inversion, loop skewing, loop tiling, unrolling and jamming, and the like. For example, with unrolling and jamming (hereinafter "unrolling") a portion of the loop is replicated, or "unrolled," and the replicated portions are inserted, or "jammed," into the code. Typically, when the unroll and jam loop transformation technique is applied to the outer loop of a nested loop pair, the outer loop's induction variable (e.g., "i") is advanced only a few times (the number of times being governed by a parameter referred to as the unroll factor—UF) rather than completely during the unrolling portion of this optimization technique. During the jamming portion of this technique, the inner loop would be replicated "UF" times. Persons of ordinary skill in the art will appreciate that the replicated loop bodies are not identical but only similar. In the replicated loop bodies, portions of the loop bodies which use the induction of the outer loop will be advanced as required (e.g., if the loop body included reference to array element A(i), where "i" is the outer loop induction variable, a replicated loop body would include reference to the next required array element—A(i+1)). The unroll and jam technique effectively reorders the calculations being performed in the nested loop.

Typically, such optimizations are performed with regard to a compiler's intermediate representation of the source code, e.g., an abstract syntax tree. The abstract syntax tree is a finite, labeled, directed tree, where the internal nodes are labeled by operators, and the leaf nodes represent the operands of the operators. The abstract syntax tree (AST) is used in a parser as an intermediate between a parse tree and a data structure, the latter of which is often used as a compiler or interpreter's internal representation of a computer program while it is being optimized and from which code generation is performed. ASTs are usually not appropriate for complex program restructuring since, while simple optimizations such as constant folding or scalar replacement may be achieved without hard modifications of the data structures, more complex transformations such as loop inversion, skewing, tiling, etc., modify the execution order, which is far away from the syntax. See Cedric Bastoul, "Code Generation in the Polyhedral Model is Easier Than You Think," PACT'13 IEEE International Conference on Parallel Architecture and Compilation Techniques, pages 7-18, Juan-les-Pins, September 2004, which is hereby incorporated by reference.

The polyhedral model, which is based on a linear algebraic representation of programs and transformations, was developed to address this issue. See Bastoul et al. "Putting Polyhedral Loop Transformations to Work," LCPC'16 International Workshop on Languages and Compilers for Parallel Computers, LNCS 2958, pages 209-225, College Station, October 2003, which is hereby incorporated by reference. The polyhedral model is basically a plugin to the conventional compilation process. It starts from the AST by translating the program parts that fit the model into a linear-algebraic representation. A new execution order is then selected by using a reordering function, e.g., using a schedule, placement or chunking function. Then, in a code generation step, an AST or new source code is returned that implements the execution order implied by the reordering function.

As an example of the polyhedral transformation consider the syntactic form of a polynomial multiplication kernel as represented in FIG. 1A. See Vasilache et al., "Polyhedral Code Generation in the Real World," INRIA, 2006, available at http://hal.inria.fr/inria-00001106/en/. This example is concerned only with the control aspects of the program source code with the two computational statements (array assignments) being referred to herein by their names S1 and S2. The polyhedral transformation model considers statement instances. For each statement, the iteration domain where every statement instance belongs is considered. The iteration domains are described using affine constraints that can be extracted from the program control. For example, the iteration domain of statement S1, referred to as $D_{S1}$, is the set of values (i) such that $2 \leq i \leq n$. As shown in FIG. 1B, a matrix representation is used to represent such constraints: $A*x + Ap*p \geq 0$, where A is the iteration matrix, x is the iteration vector (composed of the loop counters), Ap is the parameter matrix and p is the parameter vector (composed of the unknown constants and the scalar 1). Thus, in the example of FIGS. 1A and 1B, $D_{S1}$ is characterized by:

$$\begin{bmatrix} 1 \\ -1 \end{bmatrix} \cdot (i) + \begin{bmatrix} 0 & -2 \\ 1 & 0 \end{bmatrix} \cdot \begin{pmatrix} n \\ 1 \end{pmatrix} \geq 0.$$

In this framework, a transformation is a set of affine scheduling functions written $\theta(x)=T*x+Tp*p$. Each statement has its own scheduling function which maps each runtime statement instance to a logical execution time. In the polynomial multiplication example of FIGS. 1A and 1B, an optimizer may notice a locality problem and discover a good data reuse potential over array z, then suggest $\theta_{S1}(i)=(i)$ and $$\theta_{S2}\begin{pmatrix} i \\ j \end{pmatrix} = (i+j+1)$$

to achieve better locality. See Bastoul et al., "Improving Data Locality by Chunking," CC' 12 Intl. Conf. on Compiler Construction, LNCS 2622, pages 320-335, Warsaw, April 2003, which is hereby incorporated by reference, for a method to compute such functions. The intuition behind such transformation is to execute consecutively the instances of S2 having the same i+j value (thus accessing the same array element of z) and to ensure that the initialization of each element is executed by S1 just before the first instance of S2 referring to this element. A transformation is applied in the polyhedral model by using the transformation formula shown in FIG. 1C, where t is the time-vector, i.e. the vector of the scheduling dimensions. The resulting polyhedra, for the example, is shown in FIG. 1D with the additional dimension t.

Once the transformation has been applied in the polyhedral model, one needs to generate the target code. A syntax tree construction scheme, which may consist of a recursive application of domain projections and separations, such as described in Bastoul "Code Generation in the Polyhedral Model is Easier Than You Think" and Quillere et al., "Generation of Efficient Nested Loops from Polyhedra," International Journal of Parallel Programming, 28(5):469-496, October 2000, is applied to the transformation. The final code is deduced from the set of constraints describing the polyhedra attached to each node in the AST.

In the above example, the first step is a projection onto the first dimension t, followed by a separation into disjoint polyhedra as shown on the top of FIG. 2A. This builds the first loop level of the target code (the loops with iterator t shown in FIG. 2B). The same process is applied onto the first two dimensions (on the bottom of FIG. 2A) to build the second loop level, and so on. The final code is shown in FIG. 2B. Note that the separation step for two polyhedra needs three operations: $D_{S1}$-$D_{S2}$, $D_{S2}$-$D_{S1}$, and $D_{S2} \cap D_{S1}$, thus for n statements, the worst case complexity is $3^n$.

The polyhedral loop transformation-based approach to compiler optimization addresses several weaknesses of the traditional loop-based approaches to source code optimization. The polyhedral loop transformation approach addresses non-perfectly nested loops, has a precise instant-wise representation of data dependencies, and naturally supports compositions of complex transformations. As a result, it can detect more parallelism and exploit more data locality for more complex loop nests than the traditional loop-based approaches.

However, while the polyhedral loop transformation-based approach provides improved optimization of source code during the compilation process, it is not more widely used because of two main drawbacks. First, the code that is generated from the polyhedral representation is not always optimal with regard to some optimization criteria. This means that code that has excellent properties, such as data-parallelism (meaning that the work within a given loop or set of loops is data parallel and thus can be computed in parallel by possibly multiple threads on possibly multiple processors) and data locality (meaning the data needed to compute a specific amount of work generated by a given loop or set of loops often reuses the same set of data or a set of data that is collocated in memory) may be slowed down because of sub-par scalar performance (meaning that the generated code has high overhead due to unnecessary checks, branch, loop bound computations, and/or any other overheads) and/or unnecessary code bloat, i.e. an increase in the size of the code due to compiler optimizations being run on the source code. Second, transformations applied to a statement by current polyhedral loop transformation approaches necessarily touch all instances of a given statement. This means that, for example, it is hard to express parallelism for a statement that is partially parallel, i.e. a statement that is parallel in all but a few boundary instances. Similarly, for data locality enhancement, requiring that tiling must be performed on all instances of a statement, including the rarely executed boundary conditions, results in unnecessary code bloat as well as increased loop overhead. Tiling is a loop optimization that aims at increasing the data locality of a computation by cutting a large set of computation, e.g. a 2 dimensional computation iterating over 0-1023 times 0-1023 by a smaller set of computation on a smaller tile, e.g. 0-63x0-63, where once the first tile is completed, one may then iterate over the second tile, e.g. 0-63x64-127, with this operation repeating with subsequent tiles until all of the original computation is completed.

SUMMARY

The illustrative embodiments provide a system and method for advanced polyhedral loop transformations of source code in a compiler. The mechanisms of the illustrative embodiments address the weaknesses of the known polyhedral loop transformation based approaches by providing mechanisms for performing code generation transformations on the intermediate representation (IR), e.g., an abstract syntax tree (AST), generated by the polyhedral loop transformation optimization of the source code. These code generation transformations have the important property that they do not change program order of the statements in the intermediate representation. This property allows the result of the code generation transformations, i.e. a new AST, to be provided back to the polyhedral loop transformation mechanisms in a program statement view, via a new re-entrance path of the illustrative embodiments, for additional optimization.

Such code generation transformations may induce statement splitting or aggregation, may modify domain and schedule components, and the like. However, they do so in a transparent manner ensuring strict equivalence of the relative orders induced by the new schedules for all instances of all statements. This strict equivalence involves program equivalence and schedule equivalence, i.e. only relative execution order of all instances of statements is required and thus, is ensured via strict equivalence. Thus, the AST generated by the polyhedral loop transformation optimizations on the program statement view will be equivalent to the new AST generated by the code generation optimizations applied to this AST from a program and schedule equivalence standpoint.

Code generation transformations may include, for example, conditional hoisting, kernel extraction, parallelism detection, modulo copy propagation. Each of these code generation transformations involves taking two arguments, i.e. a list of AST nodes referred to by prefix vectors in a loop-centric view of the program (the prefix vector list) and a propagation mode that can be "any" (all the nodes in the AST are visited), "prefix" (all the children of a given node are visited), or "exact" (only the specified node is visited). Based on the prefix vector list and the kind of propagation, a first pass of the AST is performed to flag the nodes that need to be processed. Thereafter, visitors are instantiated and used to apply core functions of the code generation transformations. The result of the code generation transformations is a modified or new AST that has lower control flow overhead. The code generation transformations do not modify the program semantics in any way although they may result in different equivalent schedules after regeneration.

The generated modified or new AST may then undergo program regeneration, which along with the code generation transformations makes the polyhedral framework of the illustrative embodiments fully iterative. Program regeneration involves transforming the modified or new AST into a stable program with respect to code generation. In order to generate a stable program, each statement in the new stable program needs to have its own domain that does not overlap with other instances of the same original statement. Each schedule must enforce the same relative order with respect to all other instances of any other statement. Furthermore, subsequent call to a separation algorithm in the program statement view optimizations of the compiler should result in the same AST as originally presented to the code generation transformations. In order to achieve all of these goals, schedule reconstruction, domain reconstruction, and domain stretching transformations are performed to generate a new stable program. This new stable program may be fed back to the program statement view stage of the compiler for further optimizations by the program statement view optimizations.

In one illustrative embodiment, a method is provided for optimizing program code. The method may comprise receiving source code for a program in a compiler, transforming the source code into a program statement view of the source code, and transforming the program statement view of the source code into a program loop view of the source code. The method may further comprise applying one or more code generation optimizations to the program statement view of the source code to generate first optimized code, generating, by a polyhedral rescan module of a re-entrance path, a second program statement view of the source code based on the first optimized code, generating second optimized code based on the second program statement view of the source code, and outputting the optimized code to a compiler for use in generating executable code for execution on a computing device. Generating the second program statement view via the re-entrance path may comprise recombining instances of statements in the program loop view prior to a polyhedral rescan operation of the re-entrance path being performed on the program loop view of the source code.

The program loop view of the source code may be a hierarchical ordered graph of the source code where each inner node of the graph corresponds to an iteration domain at a given depth in a loop nest structure. Each leaf node of the graph may have a list of statements that are enclosed by a loop nest corresponding to the leaf node. Each node in the graph may be associated with a domain. Each domain may be a polyhedral representation of a domain associated with statements enclosed by the node and projected to reflect a depth of the node within the graph.

Each statement in the program statement view may have an associated schedule data structure. The schedule data structure may be maintained and stored in association with corresponding statements in the program loop view of the source code.

The method may further comprise detecting, in the program loop view of the source code, nodes containing hoistable conditional statements and marking a parent node as a boundary node for a re-entrance operation. Moreover, the method may comprise identifying for each marked boundary node of a given depth in the program loop view of the source code, all instances of a given statement and generating, in the first optimized code, a single compound statement representing all of the instances of the given statement at the given depth in the program loop view of the source code. Furthermore, the method may comprise setting a new domain for the compound statement as a union of domains over all instances of the given statement.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1A is a syntactic form of a polynomial multiplication kernel;

FIG. 1B is a matrix representation of the polynomial multiplication kernel of FIG. 1A;

FIG. 1C is a transformation formula that is applied in the polyhedral model where t is the time-vector;

FIG. 1D is a polyhedra resulting from the application of the transformation formula of FIG. 1C to the matrix representation in FIG. 1B with the additional dimension t;

FIG. 2B illustrates example final code obtained by using the separation operation of FIG. 2A;

FIGS. 6A-6F are diagrams illustrating the program statement view and examples of the loop optimizer 530 transformations that may be performed on the program statement view;

FIGS. 7A-7C illustrate a mapping using Quillere's projection and decomposition technique;

FIG. 11 is an example of pseudocode of an algorithm for applying code generation optimizations/transformations;

FIG. 12A represents an example of original code for illustrating a conditional hoisting operation in accordance with one illustrative embodiment;

FIG. 12B represents the same code as in FIG. 12A with a gentle, or least aggressive, mode of conditional hoisting having been performed in accordance with one illustrative embodiment;

FIG. 12C represents the same code as in FIG. 12A with an aggressive mode of conditional hoisting having been applied in accordance with one illustrative embodiment;

FIG. 13A represents an example of original code for illustrating a kernel extraction operation in accordance with one illustrative embodiment;

FIG. 13B illustrates skewing of the original code of FIG. 13A along a first dimension in accordance with one illustrative embodiment;

FIG. 13C illustrates a result of the kernel extraction code generation optimization/transformation in accordance with one illustrative embodiment;

FIGS. 14A-14C are exemplary diagrams illustrating a manner for expressing parallelism in source code in accordance with one illustrative embodiment;

FIGS. 16A-16C are exemplary diagrams illustrate a large code growth that may occur as a byproduct of successive polyhedral rescan operations by a polyhedral rescan module and a successive operation of the code generation optimization/parallelism detection module;

FIGS. 17A-17C are exemplary diagrams illustrating an example of code optimization where two statements have had their speed accelerated by a factor of 3 in accordance with one illustrative embodiment;

FIGS. 18A-18F are exemplary diagrams illustrating code instability that may be introduced by a re-entrance path in a polyhedral loop transformation mechanism;

FIGS. 19A-19B are exemplary diagrams illustrating scattering domains for statements S1 and S2 and a resulting stable $AST^{P'}$ obtained using the scatter domain with stretching transformation of one illustrative embodiment;

FIGS. 20A-20C are exemplary diagrams illustrating an example of domain stretching under re-entrance in accordance with one illustrative embodiment;

DETAILED DESCRIPTION OF THE ILLUSTRATIVE EMBODIMENTS

The illustrative embodiments provide a system and method for advanced polyhedral loop transformations of source code in a compiler. The mechanisms of the illustrative embodiments address the weaknesses of the known polyhedral loop transformation based approaches by providing mechanisms for performing code generation transformations on the intermediate representation (IR), e.g., an abstract syntax tree (AST), generated by the polyhedral loop transformation optimization of the source code. These code generation transformations have the important property that they do not change program order of the statements in the intermediate representation. This property allows the result of the code generation transformations, i.e. a new AST, to be provided back to the polyhedral loop transformation mechanisms in a program statement view, via a new re-entrance path of the illustrative embodiments, for additional optimization. As such, the mechanisms of the illustrative embodiments may be implemented in a stand-alone or distributed data processing system in which a compiler is utilized to compile source code into executable code for execution on one or more data processing devices.

For example, in a distributed data processing system, the source code may be provided, such as by a client data processing device, to a server or other data processing device that runs a compiler for compiling the source code into executable code. The server or other data processing device may implement the mechanisms of the illustrative embodiments to perform polyhedral loop transformation optimizations on an intermediate representation of the source code during such compilation. Alternative, the mechanisms of the illustrative embodiments may be implemented in the same data processing device in which the source code is generated and/or originally provided. The following FIGS. 3-4 are provided as examples of a distributed and/or stand-alone data processing system which may be used to implement the mechanisms of the illustrative embodiments.

Figure 2A:
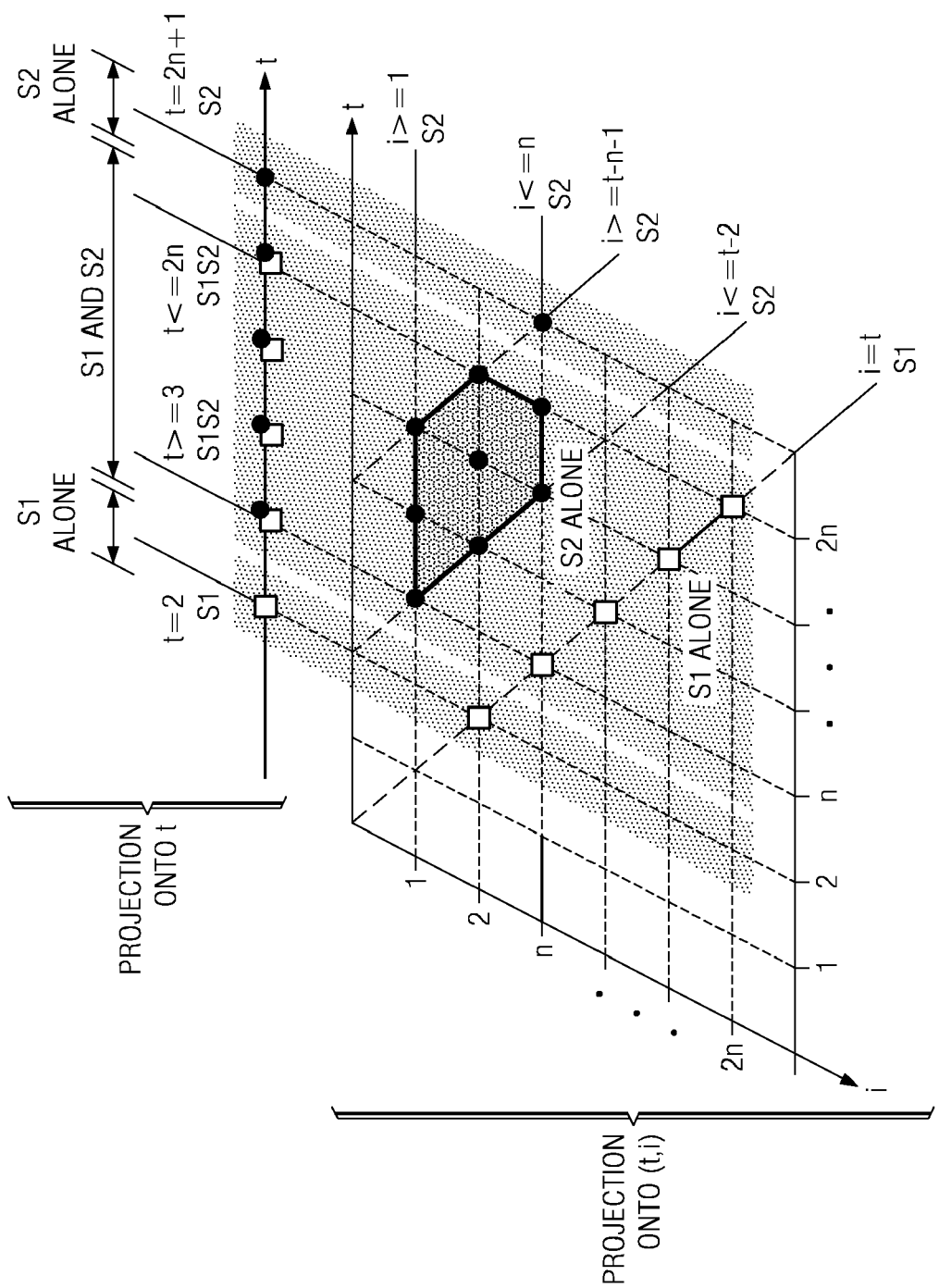
FIG. 2A illustrates a separation into disjoint polyhedra for code generation in accordance with a known operation.
Figure 3:
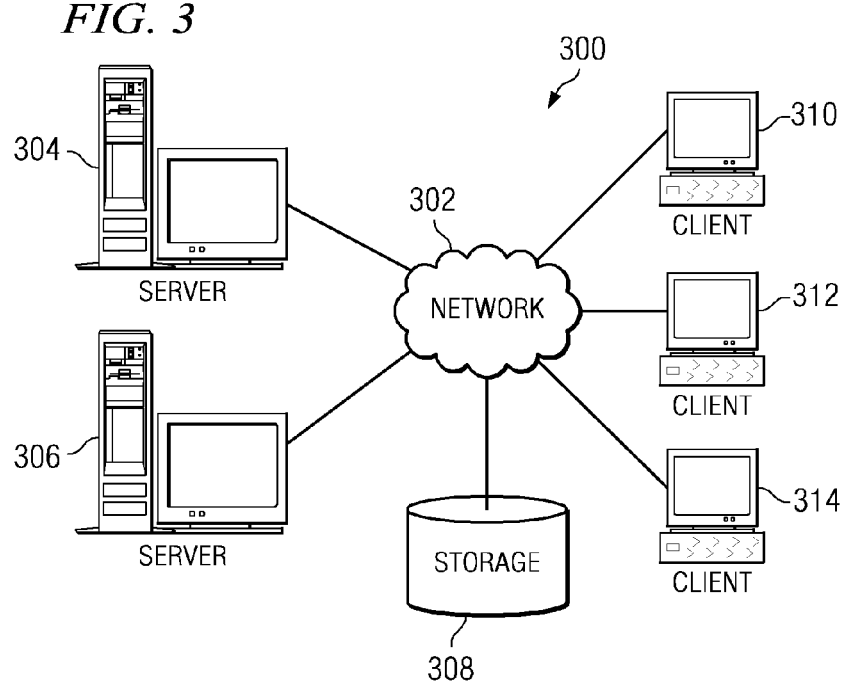
FIG. 3 is an exemplary representation of an exemplary distributed data processing system in which aspects of the illustrative embodiments may be implemented.
Figure 4:
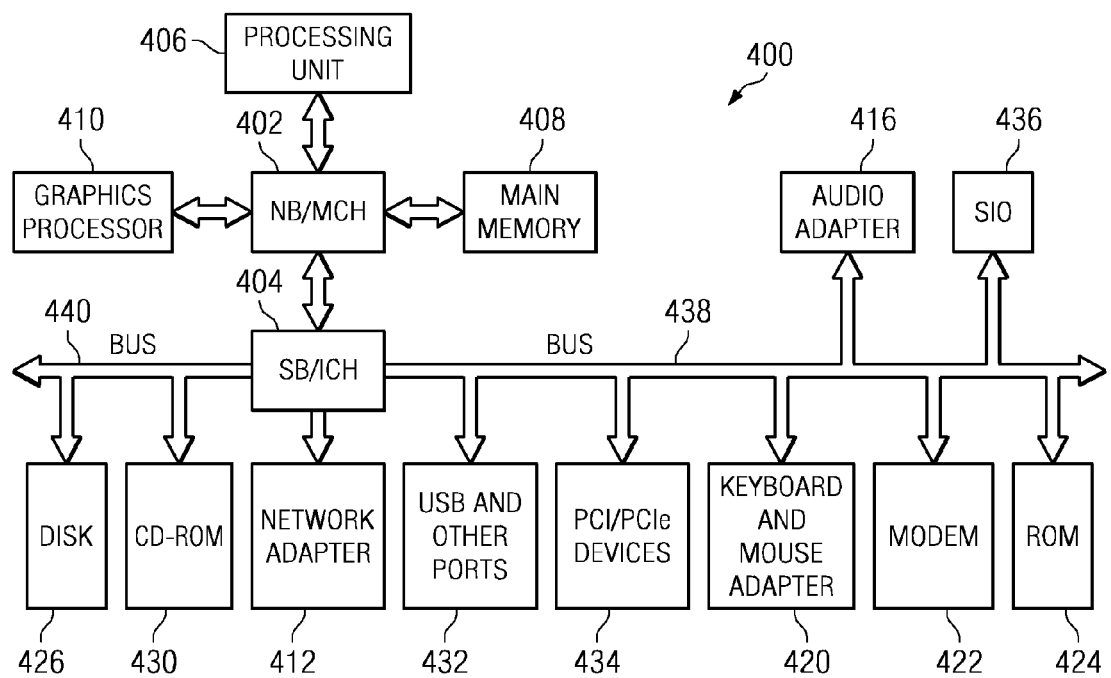
FIG. 4 is a block diagram of an exemplary data processing system in which aspects of the illustrative embodiments may be implemented.

With reference now to the figures and in particular with reference to FIGS. 3-4, exemplary diagrams of data processing environments are provided in which illustrative embodiments of the present invention may be implemented. It should be appreciated that FIGS. 3-4 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 3 depicts a pictorial representation of an exemplary distributed data processing system in which aspects of the illustrative embodiments may be implemented. Distributed data processing system 300 may include a network of computers in which aspects of the illustrative embodiments may be implemented. The distributed data processing system 300 contains at least one network 302, which is the medium used to provide communication links between various devices and computers connected together within distributed data processing system 300. The network 302 may include connections, such as wire, wireless communication links, or fiber optic cables.

In the depicted example, server 304 and server 306 are connected to network 302 along with storage unit 108. In addition, clients 310, 312, and 314 are also connected to network 302. These clients 310, 312, and 314 may be, for example, personal computers, network computers, or the like. In the depicted example, server 304 provides data, such as boot files, operating system images, and applications to the clients 310, 312, and 314. Clients 310, 312, and 314 are clients to server 304 in the depicted example. Distributed data processing system 300 may include additional servers, clients, and other devices not shown.

In the depicted example, distributed data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 300 may also be implemented to include a number of different types of networks, such as for example, an intranet, a local area network (LAN), a wide area network (WAN), or the like. As stated above, FIG. 3 is intended as an example, not as an architectural limitation for different embodiments of the present invention, and therefore, the particular elements shown in FIG. 3 should not be considered limiting with regard to the environments in which the illustrative embodiments of the present invention may be implemented.

With reference now to FIG. 4, a block diagram of an exemplary data processing system is shown in which aspects of the illustrative embodiments may be implemented. Data processing system 400 is an example of a computer, such as hosts 310 in FIG. 3, in which computer usable code or instructions implementing the processes for illustrative embodiments of the present invention may be located.

In the depicted example, data processing system 400 employs a hub architecture including north bridge and memory controller hub (NB/MCH) 402 and south bridge and input/output (I/O) controller hub (SB/ICH) 404. Processing unit 406, main memory 408, and graphics processor 410 are connected to NB/MCH 402. Graphics processor 410 may be connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash binary input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 may be connected to SB/ICH 404.

An operating system runs on processing unit 406. The operating system coordinates and provides control of various components within the data processing system 400 in FIG. 4. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 400 (Java is a trademark of Sun Microsystems, Inc. in the United States, other countries, or both).

As a server, data processing system 400 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and may be loaded into main memory 408 for execution by processing unit 406. The processes for illustrative embodiments of the present invention may be performed by processing unit 406 using computer usable program code, which may be located in a memory such as, for example, main memory 408, ROM 424, or in one or more peripheral devices 426 and 430, for example.

A bus system, such as bus 438 or bus 440 as shown in FIG. 4, may be comprised of one or more buses. Of course, the bus system may be implemented using any type of communication fabric or architecture that provides for a transfer of data between different components or devices attached to the fabric or architecture. A communication unit, such as modem 422 or network adapter 412 of FIG. 4, may include one or more devices used to transmit and receive data. A memory may be, for example, main memory 408, ROM 424, or a cache such as found in NB/MCH 402 in FIG. 4.

Those of ordinary skill in the art will appreciate that the hardware in FIGS. 3-4 may vary depending on the implementation. Other internal hardware or peripheral devices, such as flash memory, equivalent non-volatile memory, or optical disk drives and the like, may be used in addition to or in place of the hardware depicted in FIGS. 3-4. Also, the processes of the illustrative embodiments may be applied to a multiprocessor data processing system, other than the SMP system mentioned previously, without departing from the spirit and scope of the present invention.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device which is configured with flash memory to provide non-volatile memory for storing operating system files and/or user-generated data, for example. Essentially, data processing system 400 may be any known or later developed data processing system without architectural limitation.

With the data processing systems of FIGS. 3-4, assuming a distributed data processing system implementation, source code may be provided to a data processing system 400, such as server 304 in FIG. 3, from a client data processing device, such as client 310 in FIG. 3, or the like, for compilation into an executable program. The mechanisms of the illustrative embodiments improve upon known compiler techniques that utilize polyhedral loop transformations to optimize the source code during compilation. The mechanisms of the illustrative embodiments convert a traditional program statement view of the source code into a program loop view of the source code such that each individual statement in the source code may be operated on rather than the program as a whole. Thereafter, the loops in the program loop view are optimized using code generation transformations that improve the control flow overhead of the program without modifying the program order of the statements in the program statement view of the program. As a result, after the optimizations, the resulting modified program loop view of the program may be converted back to a program statement view of the program for further optimization.

Figure 5:
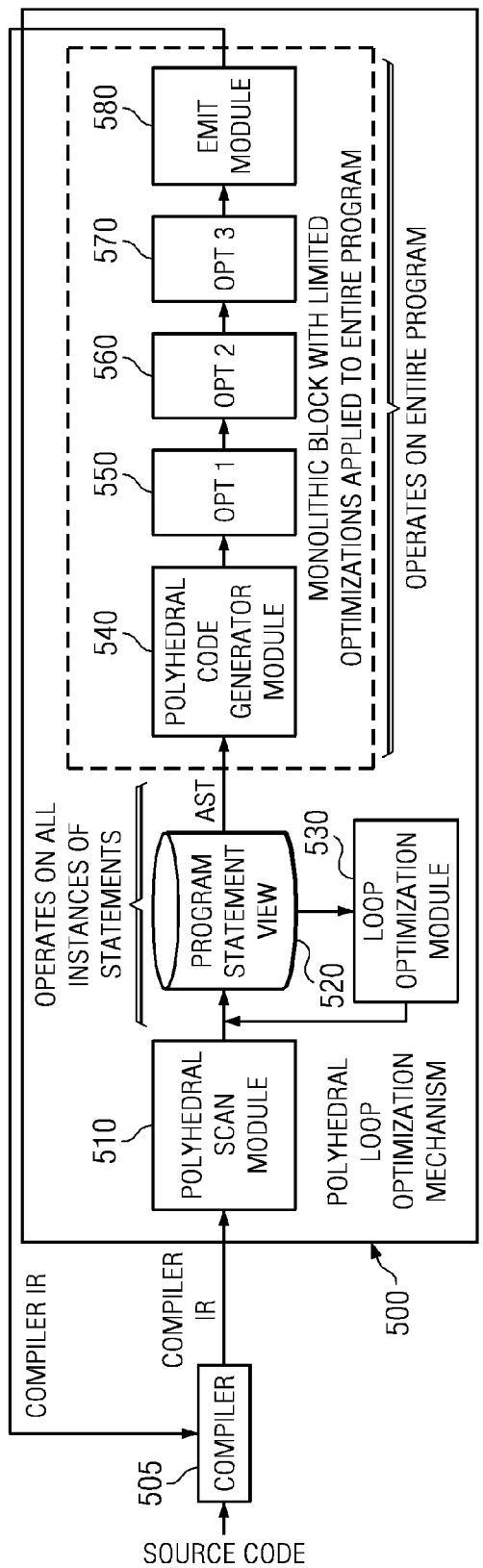
FIG. 5 is an exemplary diagram illustrating a traditional or conventional polyhedral approach to source code optimization during compilation.

FIG. 5 is an exemplary diagram illustrating a traditional or conventional polyhedral approach to source code optimization during compilation. The polyhedral loop optimization mechanisms are part of one of many compiler phases. The input and output of the polyhedral loop optimization mechanism 500 are given in a compiler internal representation (IR) of statements, conditionals, and loops received from a compiler 505. As shown in FIG. 5, the polyhedral loop optimization proceeds from left to right in FIG. 5 starting with a polyhedral scan by a polyhedral scan module 510 of the original program from the compiler's IR into a polyhedral representation, referred to as the program statement view 520. In this representation, each statement in the source code is associated with a polyhedron describing its domain (how many times it iterates in each of its loop dimensions) as well as its schedule (when it is executed with respect to all other statements). The schedule may be represented as a structured matrix having three sub-matrices: (1) the Alpha matrix, which represents the speed at which statements are fired along a given time dimension; (2) the Beta matrix, which represents the sequential interleaving of statements along the different loop depths; and (3) the Gamma matrix, which represents the constant parametric shifting along each time dimension. See Girbal et al. "Semi-Automatic Composition of Loop Transformations for Deep Parallelism and Memory Hierarchies, IJPP 2006, which is hereby incorporated by reference. The generation of a program statement view using a polyhedral representation is generally known in the art and thus, a detailed explanation of the mechanisms for representing a program in a program statement view using a polyhedral transformation will not be provided herein.

In the program statement view of the program, a loop optimizer module 530 is used to perform transformations on the program statement view to optimize the code. Examples of transformations performed by the loop optimizer module 530 include loop interchange, parallel wavefront, and statement shifting loop transformations, discussed in more detail hereafter. The transformations performed by the loop optimizer module 530 serve to modify the schedule of each individual statement in the program statement view to achieve better data parallelism and/or data locality of the execution of the program. The transformations performed by the loop optimizer module 530 affect all runtime instances of a given statement. Thus, it is possible to skew the execution of one statement in a loop with respect to another, or to pull a statement out of one loop and put it before/after a statement in another loop, for better data locality/parallelism.

The resulting transformed program schedule and its corresponding domain are provided to a polyhedral code generator 540 which operates on the entire program as represented by the modified IR generated by the loop optimizer module 530, based on the program statement view 520 of the program output by the polyhedral scan module 510. The polyhedral code generator 540 generates an abstract syntax tree (AST) representation of the program based on the modified IR. Some limited optimizations 550-560 may be applied to the entire program as represented by the AST. These optimizations are limited in two ways. First they apply to all nodes in the AST regardless of needs or benefits. Some known implementations apply a transformation to all nodes skipping the top X levels of the AST tree (e.g. X=2 skipping the root and the next level down but then applying the transformation to all the next levels below). Second, the list of optimization used is fairly limited to aggressive if-hoisting (meaning removal of if-conditions at the expense of sometime out-of-control code replication) and some modulo guard removal (meaning simplification of complex modulo calculus present in bound computation or if-conditional computations).

Note also that code optimizations are very different from loop optimizations in that loop optimizations typically change the structure of the computations by changing the order in which statements are executed with respect to each others and/or by adding/removing loops altogether. Code optimization, like the ones described here, however, typically do not transform the order in which statements are executed with respect to each other but simply attempt to reduce overhead generated by a overly simplistic code generation scheme.

In essence, the module 540 is designed to generate valid code, possibly with overhead due to extra bound computation, if conditional, modulo calculus in bounds and/or conditional computations. It is then the responsibility of optimizations like 550, 560, and 570 to clean up some of the introduced inefficiencies as best as possible. The resulting optimized AST is provided to a code emitter 570 which generates code from the AST in the compiler's internal representation (IR) by simply converting the internal AST and stripping it of its polyhedral information and generating an equivalent structure that is familiar and recognized by the traditional compiler.

The polyhedral code generator 540, code optimizations 550-570, and code emitter 580 operate as a monolithic block. Moreover, any, all, or any subset of the optimizations 550-570 may be bypassed if desired, as represented by the dashed curved lines, such that the particular optimizations bypassed are not applied to the AST.

Again, it is important to note that in the known mechanism shown in FIG. 5, at the program statement view 520, optimizations are performed with regard to all runtime instances of a given statement in the code. Moreover, the code optimizations 550-560 are performed with respect to the entire program. At no time are optimizations made possible with regard to individual instances of statements in a program or even sub-parts of a statement. The mechanisms of the illustrative embodiments, as discussed hereafter, provide such optimization abilities.

Figure 6A:
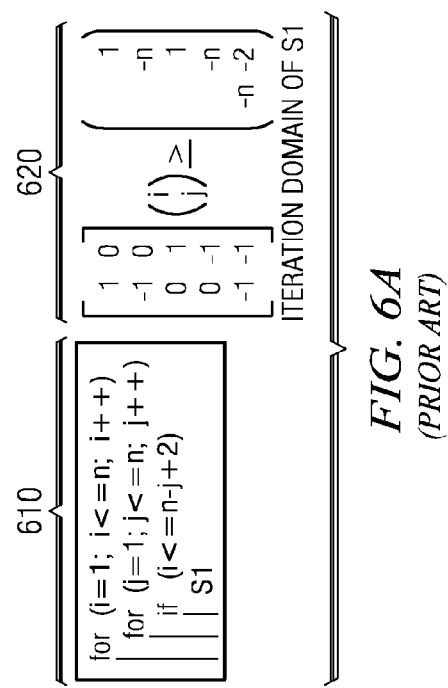

FIGS. 6A-6F are diagrams illustrating the program statement view and examples of the loop optimizer 530 transformations that may be performed on the program statement view. FIG. 6A provides some general notations for explaining the program statement view and these transformations. As shown in FIG. 6A, a statement S1 in source code 610 may be represented as an array-based inequality 620 defining the iteration domain of the statement S1. That is, each statement control can be captured through parameterized affine inequalities: $Ax \geq c$ where A is a n times m element matrix of integer numbers, x is a m element vector representing each of the iteration variables, and where c is a n element vector of integer numbers or symbolic parameters. A maximal set of such consecutive statements is referred to as a static control part (SCOP) in the polyhedral loop transformation literature. For each statement, an affine function $\theta(x)=Tx+d$ (where T is a n' times m element matrix of integer numbers, x is a m element vector representing each of the iteration variables, and where d is a n' element vector of integer numbers or symbolic parameters) assigns logical dates, e.g., time steps starting to zero and monotonically increasing, to iterations of $Ax \geq c$.

Figure 6B:
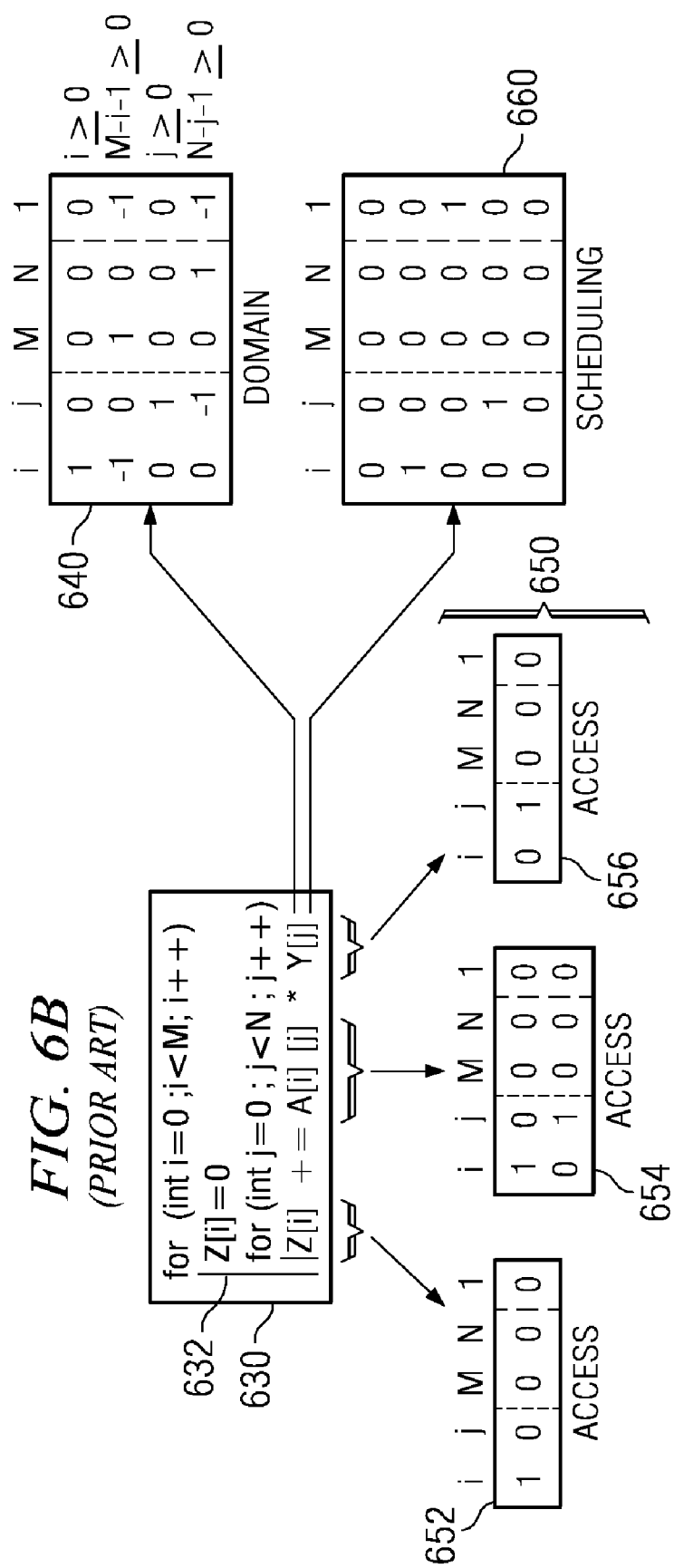

As shown in FIG. 6B, the polyhedral scan module 510 extracts an iteration domain 640, access functions 650, and schedule 660 of each statement in the source code 630. The iteration domain 640 of a statement is a set of integer values taken by the multidimensional iteration i. The iteration domain 640 may be defined as a set of linear inequalities, e.g., $i \geq 0, M-i-1 \geq 0, j \geq 0, N-j-i \geq 0$ in FIG. 6B, forming a convex polyhedron. The access functions 650 correspond to the polyhedral representation of which specific memory location is accessed for a given statement. For example, in FIG. 6B, the second statement 632 is controlled by the index variables i and j for, respectively, the outermost and the innermost loop. An access function for memory reference "Z[i]" in statement 632 will indicate, to the internal representation, which specific memory location will be written into when computing the data associated with that statement for a given instance of i and j. The access function is a matrix with one row per dimension of the array (Z[i] is a one dimensional array) and one column for each of the index variables (i and j here), parameters (M and N here) plus a constant integer. Thus the access function for Z[i] is [1 0 0 0 0] as shown in 652, as it is only a function of the index variable i.

For the "a[i][j]" reference, the access function 654 is a two dimensional array and, as a result, the access function 654 is a 2×5 element matrix. The first row corresponds to the access function for the first dimension of the array A, solely a function of index variable i here. The second row corresponds to the access function for the second dimension of the array A, solely a function of index variable j here. For Y[j], the access function 656 is again a one dimensional array that is solely a function of the index variable j.

The schedule is a linear function assigned to a statement that precisely determines a logical timestamp for the execution of each instance of a statement. These logical timestamps express a partial order between instances of statements. As with the domain 640 and the access functions 650, the schedule 660 is a linear function of the domain iterators, e.g., i and j, and global parameters, M and N. The extraction of iteration domain 640, access functions 650, and schedule 660 is generally known in the art and thus, a more detailed explanation is not provided herein.

Having extracted the iteration domain 640, access functions 650, and schedule 660, to generate a program statement view 520 of the source code, the loop optimizer 530 may perform transformations on the schedule to achieve better parallelism/locality. FIGS. 6C-6F illustrate various types of transformations that may be performed on the program statement view 520.

Figure 6C:
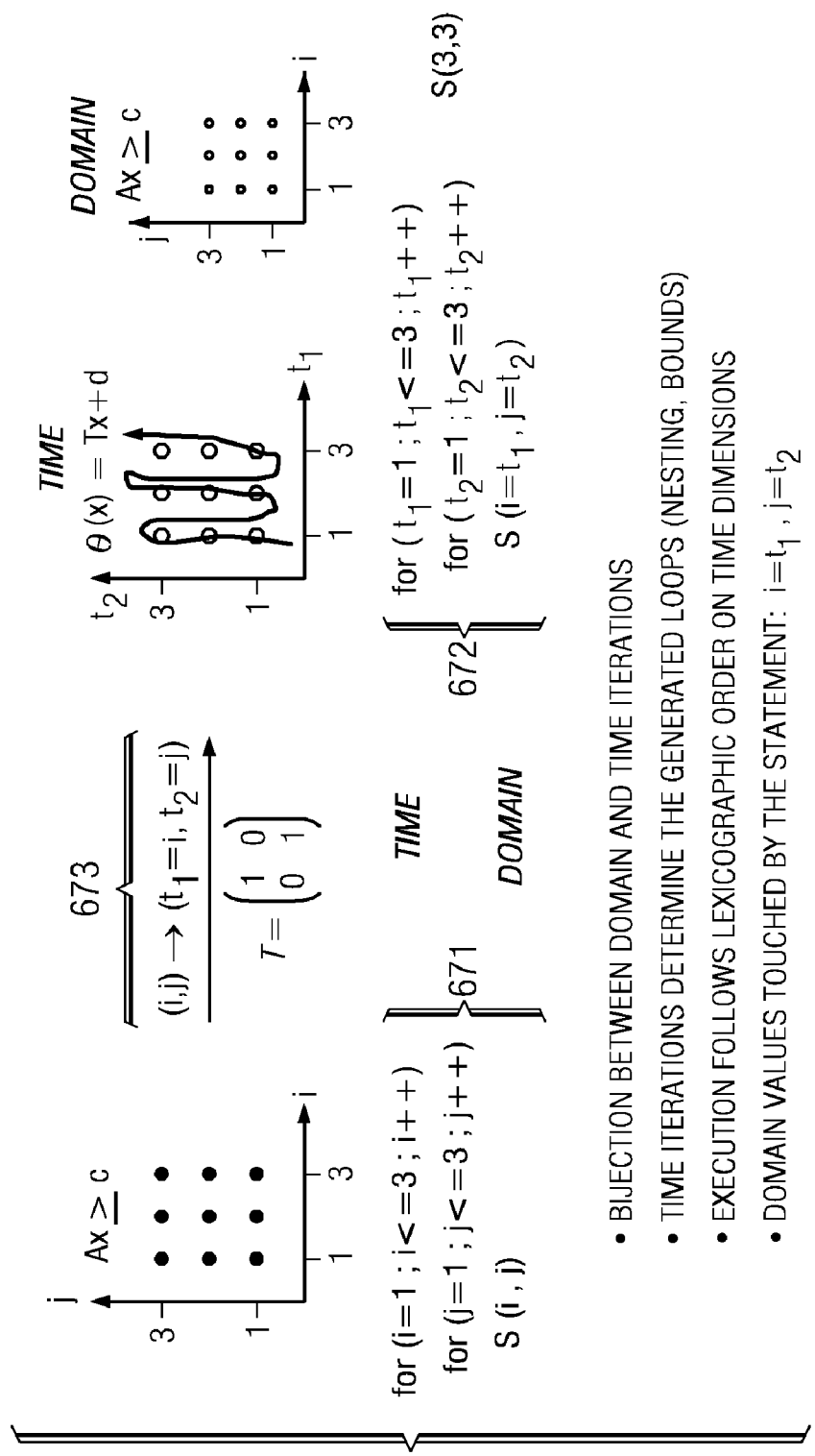

In FIG. 6C, the original code 671 is scanned through the polyhedral representation and a null-transformation is applied, depicted as element 673 in FIG. 6C. Namely, the outer loop in the original code 671, i.e. the loop iterating over index i, is mapped to the first time dimension t1 and the inner loop in the original code 671, i.e. the loop iterating over index j, is mapped to the second time dimension t2. The resulting code is shown in FIG. 6C as element 672. Note that in the statement S in the resulting code 672, the original index i is set to the same value as t1, and the original index j is set to the same value as t2. Those of ordinary skill in the art will notice that the original code 671 and the resulting code 672 will execute the same statements exactly in the same order.

Figure 6D:
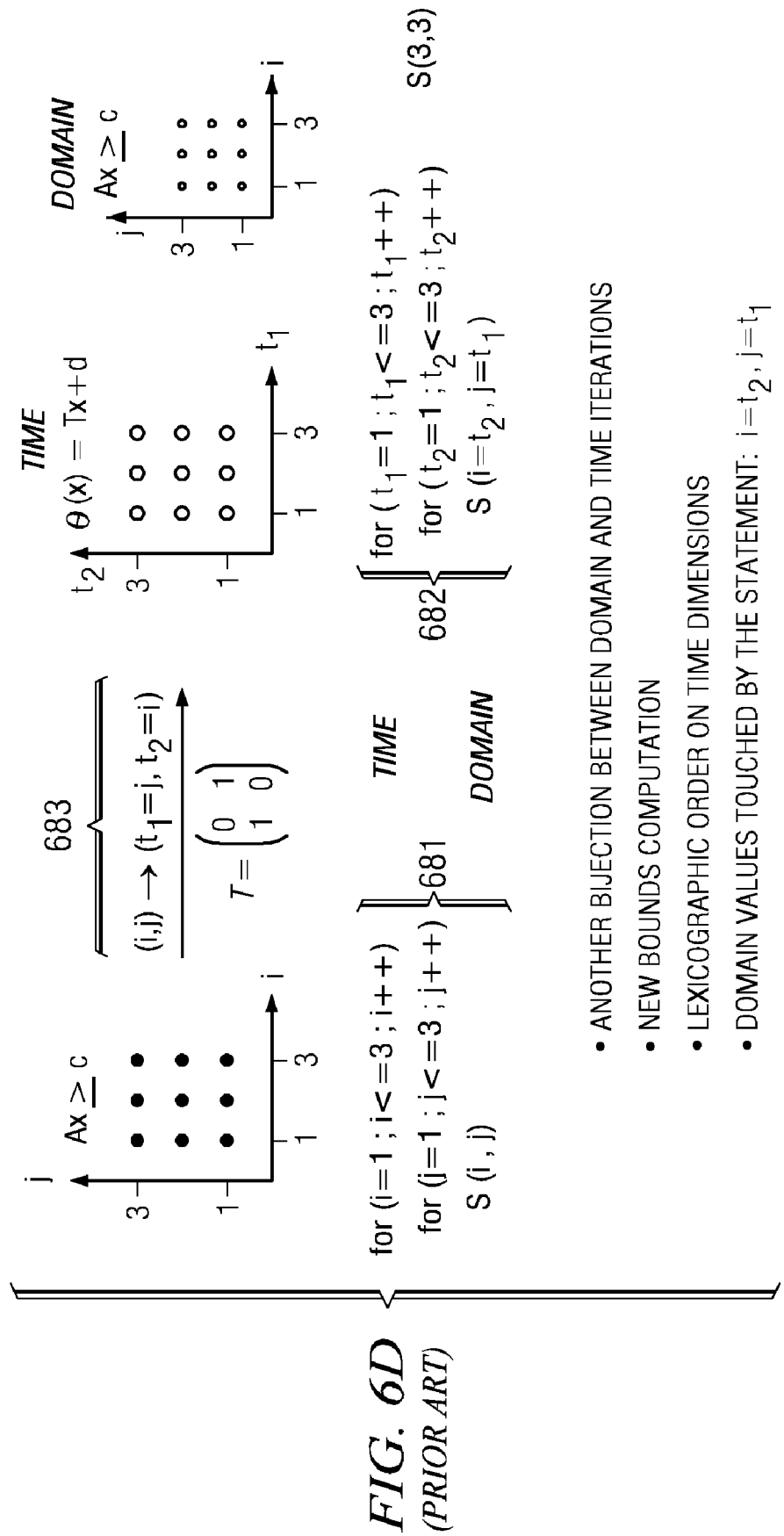

In FIG. 6D, the original code 681 is scanned through a polyhedral representation and a loop interchange transformation 683 is applied. Namely, the outer loop in the original code 681, i.e. the loop iterating over index i, is mapped to the second time dimension t2 and the inner loop in the original code 681, i.e. the loop iterating over index j, is mapped to the first time dimension t1. The resulting code is shown as element 682 in FIG. 6D. Note that in the statement S of the resulting code 682, the original index i is set to same value as t2, and the original index j is set to the same value as t1. One of ordinary skill in the art will notice that the original code 681 executes the statements in which, for a given value of i, all the values of j will be visited before visiting the next value of i. However, in the resulting code 682, the code executes the statements in a different order. Namely, for a given value of j, all the values of i will be visited before visiting the next value of j. This transformation is referred to as an interchange of the loop i and j, precisely because of this change in ordering.

In FIG. 6E, the original code 691 is scanned through the polyhedral representation and a loop skewing and parallelization transformation 693 is applied. In this transformation 693, the two i and j indices are projected to a single time dimension t1=i+j. Thus, at the logical time date t1=3, the original iteration (i=1,j=2) and (i=2, j=1) are logically executed. This is illustrated by the DOALL loop in the resulting code 692. A DOALL loop is a parallel execution of a loop, where logically all the iterations can be executed in parallel.

In FIG. 6F, the original code 694 is scanned through the polyhedral representation and a loop shift transformation 697 is applied where the two matrices T1 and T2 are unchanged but where the vector D2 is (1, 0) instead of the original default value of (0, 0). This means that the second statement S2 will start executing one full outer-loop iteration step after the first statement S1. The resulting code is shown as element 695. Note that in the first portion 698, the statement S1 executes alone for the full t2=1 to 3 range of iterations, before statements S1 and S2 start to jointly operate in the portion 696. At the end of the execution of the doubly nested loop in portion 696, one full outer-loop iteration step will remain to be computed for the second statement S2. This remaining outer-loop iteration step is computed in portion 699.

With reference again to FIG. 5, the optimized program statement view 520 generated through operation of the loop optimizer mechanism 530 is mapped, by the polyhedral code generator 540 to a hierarchical set of loop structures referred to as an abstract syntax tree (AST). The mapping is performed by using a Quillere's projection and decomposition technique, which is generally known in the art. See Quillere et al., "Generation of Efficient Nested Loops From Polyhedra," International Journal of Parallel Programming, 28(5):469-498, October 2000. The AST represents the imperative execution of the program statements in the source code. More precisely, each intermediate node of the program in the AST bears a polyhedron whose size is related to the depth d of the node. Each such polyhedron defines the non-redundant set of constraints needed to scan all the points in the corresponding transformed loop of depth d. The nesting of these polyhedra is directly translated into the nesting of the resulting loop nest. The leaves of the tree represent the polyhedral statements.

Figure 7C:
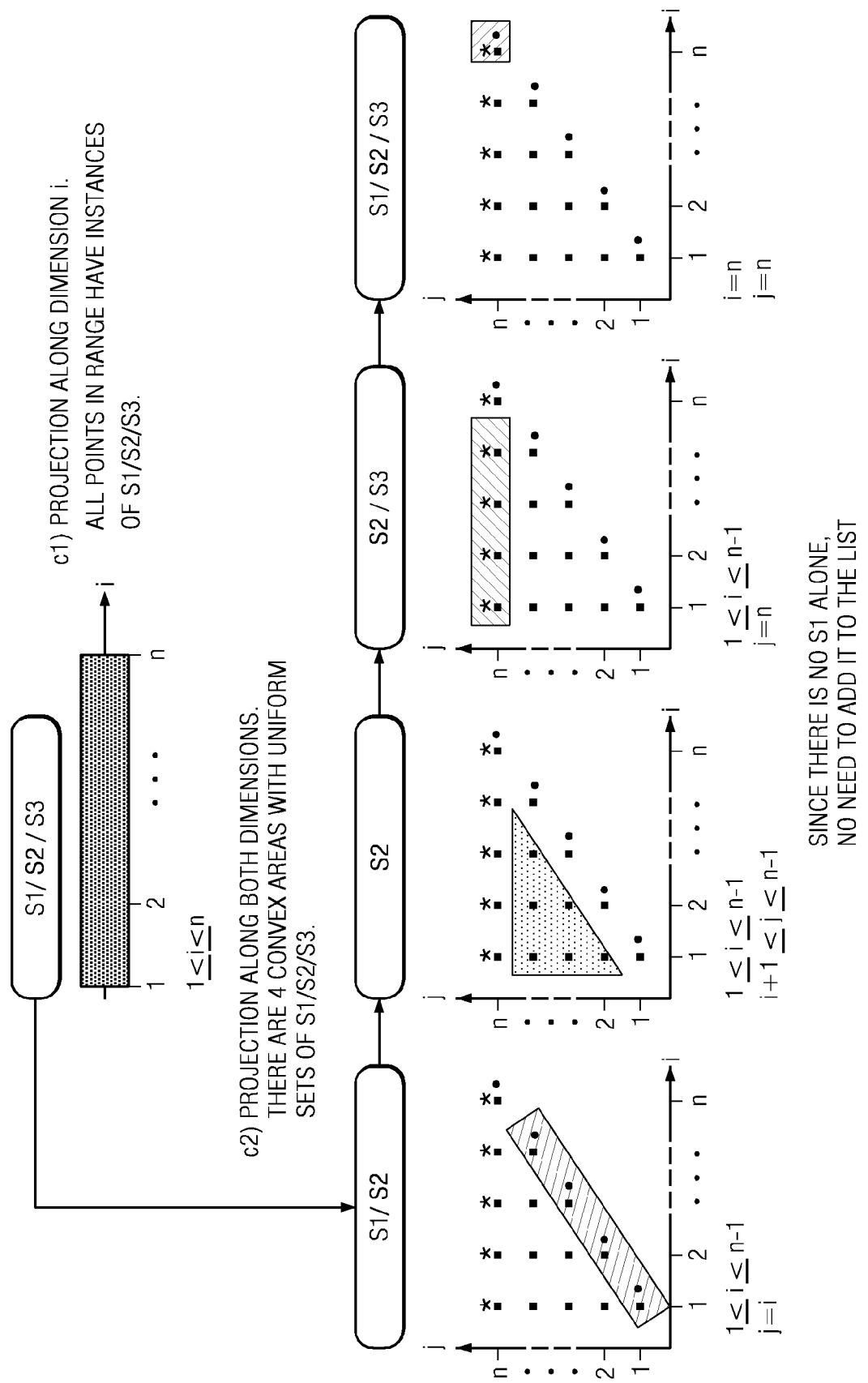

FIGS. 7A-7C illustrate a mapping using Quillere's projection and decomposition technique. Given the code fragment shown in FIG. 7A, three statements S1, S2, and S3 are present and the subject of the polyhedral loop transformation. A set of points 710 iterated by the three statements is generated and the set of points 710 is separated into convex areas of uniform statement sets 712-718. The abstract syntax tree (AST) is formulated by projecting along each of the dimensions using the above mentioned Quillere's projection and decomposition technique. Usually, the most straightforward way to generate the resulting AST is to apply the following simplified steps: 1) create the scattering polyhedron for each statement by extending the iteration domain with the equalities linking time iterations to domain iterations; 2) recursively project the previous polyhedron on the outermost time dimensions to determine the span of each statement along every transformed time dimension; 3) recursively perform the intersection, difference, and ordering of the previously projected scattering polyhedra for all statements to distribute their iterations along the new time loops; and 4) recursively sort the disjoint union of polyhedra along each time dimension. For more detailed explanations of these steps, reference is made to the work of Quiller'e et al. previously mentioned above.

The resulting AST is hierarchical, with the top node representing an outermost loop. This node corresponds to a single interval parallel to the i-axis after projecting away the j-dimension. Since, in the depicted example, all 3 statements have the same interval i=1 . . . n in this projected one-dimensional space, all 3 statements belong to this single node. Thus, there are 4 nodes 720-750, one for each distinct area in FIG. 7B. A domain is associated with each node. Domains are shown next to each node 720-750 in FIG. 7C.

It is important to note that nodes sharing a single parent are ordered. This order must represent a correct sequence with respect to the original order in the original program, or at least, if the original order was modified by loop transformation, must not violate any dependence present in the original program.

As discussed above, minor optimizations may be made to the AST generated through the operations above which are applied to the program as a whole. The resulting AST is then used to generate a compiler internal representation (IR) and is provided back to the compiler.

Moreover, as discussed above, the polyhedron-based approach described above has some significant drawbacks in that (1) it may not always generate optimal code; and (2) the transformations performed necessarily touch all instances of a given statement, rather than individual instances. This means that the code may suffer from sub-par scalar performance, unnecessary code bloat, and parallelism may be difficult to express for statements that are partially parallel, i.e. a statement that is parallel in all but a few boundary instances. Moreover, for data locality enhancement, requiring that tiling must be performed on all instances of a statement, including the rarely executed boundary conditions, results in unnecessary code bloat as well as increased loop overhead. Thus, it would be beneficial to have a mechanism for allowing optimizations to be performed on individual instances of statements.

Figure 8:
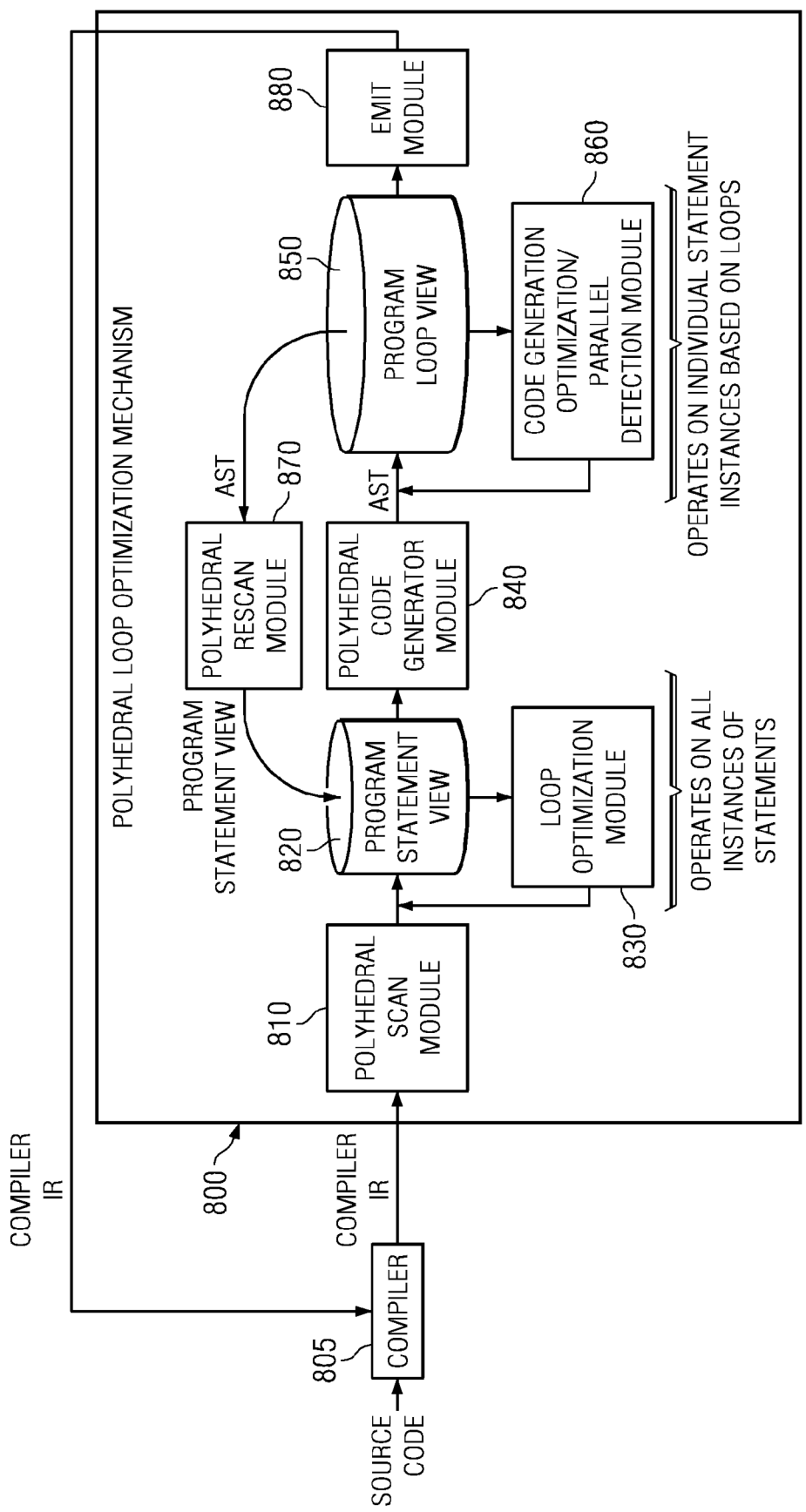
FIG. 8 is an exemplary block diagram of an advanced polyhedral loop transformation mechanism in accordance with one illustrative embodiment.

FIG. 8 is an exemplary block diagram of an advanced polyhedral loop transformation mechanism in accordance with one illustrative embodiment. As shown in FIG. 8, with the advanced polyhedral loop transformation mechanism 800, a compiler internal representation (IR) of statements, conditionals, and loops is provided from the compiler 805 to the polyhedral scan module 810 which operates in much the same manner as the known polyhedral scan module 510 in FIG. 5 to generate a program statement view 820 of the source code. Loop optimizer module 830 may apply various loop optimizations on the statements in the program statement view 820 in much the same manner as the loop optimizer module 530 in FIG. 5. The resulting optimized program statement view of the source code is provided to the polyhedral code generator 840. This is where the mechanisms of the illustrative embodiments depart from the known polyhedral loop transformation mechanisms and provide advanced optimization mechanisms not previously known.

There are two main directions in which the mechanisms of the illustrative embodiments improve upon known compiler mechanisms. First, the mechanisms of the illustrative embodiments provide a re-entrance path (shown as the arc passing through the polyhedral rescan module 870). In order to make this re-entrance path workable in the illustrative embodiments, data about the way in which the polyhedral code generation is performed, is maintained for use by the polyhedral rescan module 870 to convert the AST, or program loop view, 850 back into a program statement view 820. This data may include, for example, the Alpha, Beta, and Gamma matrices for each of the statements in the AST 850 along with a remapping matrix that identifies how a transformation back to a program statement view from the AST, or program loop view, 850 may be performed.

In the second major direction of improvement, the mechanisms of the illustrative embodiment provide an improved manner by which code generation optimizations may be applied by the code generation optimization/parallel detection module 860. These code generation optimizations may be applied with greater flexibility than known mechanisms since there is no fixed sequence of code generation optimizations, there are a greater number of code generation optimizations, and the code generation optimizations may be applied to specific sub-trees of a given AST 850.

In addition to the improvements above, the mechanisms of the illustrative embodiments provide functionality for determining when to reunite statements, upon re-entrance, that were split by the polyhedral code generator module 840. That is, when the polyhedral code generator module 840 operates on the program statement view 820, sometimes the Quillere projection discussed above may result in statements being split into multiple nodes of the resulting AST or program loop view 850. For example, in FIGS. 7A-7C, statement S1 appears in two of the leaf nodes of the resulting AST and S2 appears in four of the leaf nodes due to such splitting of statements.

Sometimes it is desirable to keep the statement separated when doing re-entrance and in other situations it is more desirable to reunite the separated statement into a single statement in the resulting program statement view of the re-entrance. Thus, in the polyhedral rescan module 870, a determination may be made whether to keep the separated statement separate or to reunite the separated statement. This will be described in greater detail hereafter with regard to FIG. 10, for example. As will be described later, it is desirable, for example, to keep a statement separated in order to perform optimizations on the kernel only, while other times, reuniting the statement is proper. This decision may be made automatically by the polyhedral rescan module 870, or in response to user commands, such as through directives/scripts, or the like. The details of the various improvements provided by the illustrative embodiments will be described in greater detail hereafter.

As shown in FIG. 8, the polyhedral code generator 840 of the illustrative embodiments converts the program statement view 820 of the source code into a program loop view or AST 850. In this view of the source code, each loop is associated with a set of statements that iterates over the same number of iteration points as experienced at a given depth level in the loop nest hierarchy. An example of the program statement view 820 is the data gathered in FIG. 6B. An example of the program loop view or AST 850 is shown in FIG. 7C. The major difference between the program statement view 820 and the program loop view or AST 850 is that in a program loop based representation, two or more statements can be assigned to the same logical loop even though the statements do not have exactly the same domain. For example, in FIG. 9, discussed hereafter, loop 1 and loop 2 can be fused even though the domains do not strictly overlap. When generating the AST 850, each of the nodes (which correspond to a loop, but for the leaf nodes that correspond to a statement) correspond to strictly one loop in which all the statements inside have exactly the same sub-domain. This is why one statement in the program statement view 820 may become many nodes in the program loop view or AST 850, e.g. statements in loop1 in FIG. 10, hereafter, become 3 statements and statements in loop2 also become 3 statements.

Thus, in the program loop representation, an original statement in the program statement view 820 may be split among several loops in the program loop view 850. For example, if two statements S1 and S2 were fused into a single loop but S1 iterates from 0 to 100 whereas S2 iterates only from 0 to 80, then the statement S1 may be split into two loops in the program loop view 850, one from 0 to 80 when it co-executes with S2 and one from 81 to 100 where it executes by itself.

Figure 9:
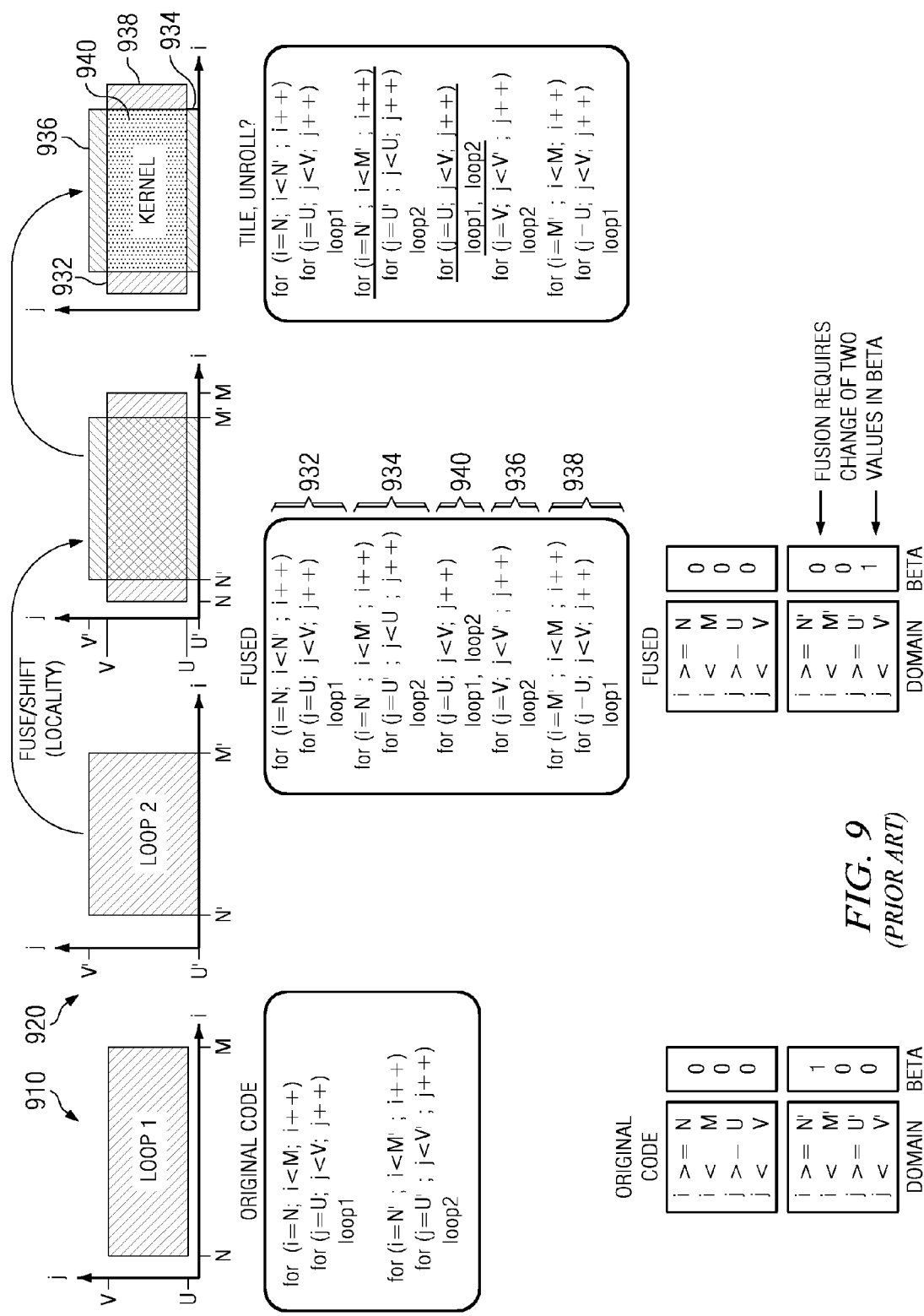
FIG. 9 illustrates an example of a polyhedral loop transformation fusion operation.

That is, one type of loop optimization that is often performed, such as by loop optimizer module 830, in polyhedral loop transformations is "fusion." Fusion attempts to improve data locality by fusing two loops that iterate over similar ranges into a single loop. FIG. 9 illustrates an example of a polyhedral loop transformation fusion operation. As discussed above, with polyhedral loop transformations, statements are represented as polyhedrons representing the iteration space of the loops associated with the statement. Thus, for example, as shown in FIG. 9, a first statement S1 is associated with two loops with bounds i=N, i<M, j=U, j<V. These bounds define a rectangle as illustrated in the first graph 910. Similarly, the second statement S2 is associated with two loops whose bounds i=N', i<M', j=U', j<V', overlap the area of the first statement S1. This second statement S2 is represented by the rectangle shown in the second graph 920.

Through fusion, the two statements are integrated with the result being as shown in the graph 930. As shown in FIG. 9, the corresponding code includes loops 932-938 for representing the non-overlapping portions of the rectangles 910 and 920 and a loop 940 that represents the fused "kernel" of the statements S1 and S2 which represents the majority of instances of execution of the statements S1 and S2. Fusion thus, increases the speed of execution of the original code by causing the majority of area where the two statements S1 and S2 execute to be executed together. However, it can be seen from FIG. 9 that fusion requires a large amount of replication of code.

With reference again to FIG. 5, in generating the program loop view 550 from the loop optimized program statement view 520, the polyhedral code generator 540, separates the kernels, i.e. the common area or range of iterations, of fused statements such that separate representations of the statements are provided. This is because, in the program loop view or AST 550, output by the polyhedral code generator 540, each loop can only contain a single set of instructions. However, since there is no reentrance in the mechanism shown in FIG. 5, the framework of FIG. 5 cannot apply specific loop optimizations implemented in the loop optimization module 530 only to the statements that are part of the kernel (e.g., the section of code fragment 940 in FIG. 9 where both statements S1 and S2 are being jointly executed). To the contrary, as mentioned above, in the mechanism of FIG. 5, loop optimizations can only be applied to the program as a whole.

In other words, the original representation 520 includes statements S1 and S2 for their entire domain on which optimizations are being applied. The polyhedral code generator 540 discovers the actual loops that the fused statements S1 and S2 will execute in, but by then, i.e. after the polyhedral code generator 540 has operated, it is too late to apply new loop optimizations defined in the loop optimization module 530 because the optimizations in 550, 560, and 570 operate on a AST representation that is not amendable to optimizations such as in loop optimization module 530. As a result, for example, it is not possible in the framework described in FIG. 5 to perform such loop optimizations as a unrolling optimization of the kernel using the powerful loop optimization module 530 operating over the program statement view 520.

Figure 10:
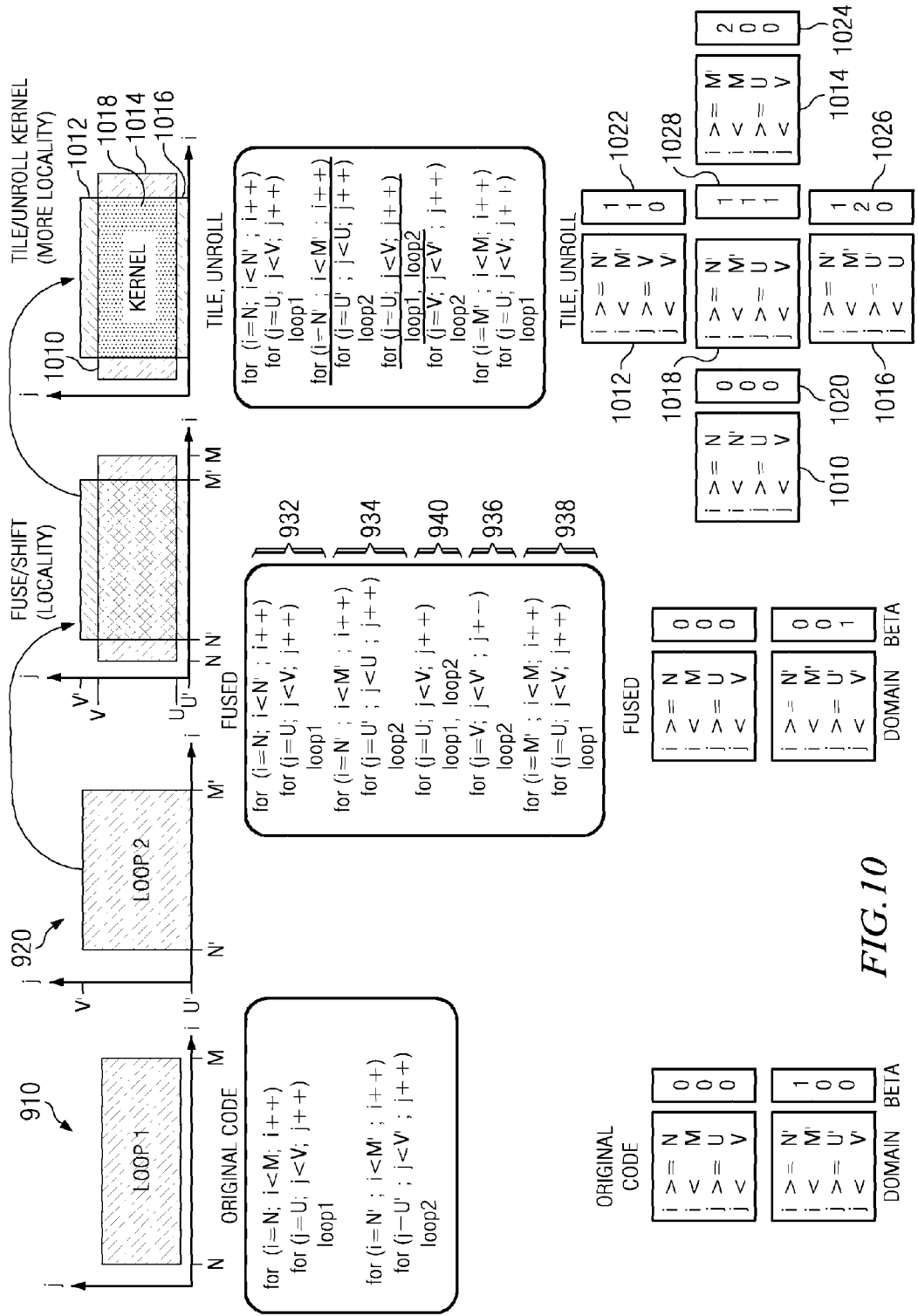
FIG. 10 illustrates the separation of fused loops into separate representations for each portion of the fused loops such that the representations are not shared.

The mechanisms of the illustrative embodiments provide functionality for separating out the kernels of fused loops such that separate representations of statements are obtained upon which optimizations may be performed. FIG. 10 illustrates the separation of fused loops into separate representations for each portion of the fused loops such that the representations are not shared. With reference again to FIG. 8, in generating the program loop view or AST 850 from the loop optimized program statement view 820, the polyhedral code generator 840, separates the kernels of fused statements such that separate representations of the statements are provided. This is again because in the program statement view or AST 850 representation output by the polyhedral code generator 840, each loop can only contain a single set of instructions.

However, with the mechanisms of the illustrative embodiments, the reentrance path (depicted as the arc from element 850 through element 870 to element 820) may be activated. With this reentrance path, each of the instances of statement S1 and S2 may be considered as separate. In other words, the domain of statement S1 may be split into the sub domains corresponding to the area/code fragment 1010, 1018, and 1014 in FIG. 10 and the domain of statement S2 may be split into the sub domains corresponding to the area/code fragment 1012, 1018, and 1016. As a result of S1 and S2 now not sharing a common representation, loop transformations may now be applied, e.g., by the loop optimization module 830 in FIG. 8, on the separate representations. For example, the loop containing both instances of statements S1 and S2, e.g., the area/code fragment corresponding to 1018 in FIG. 10, may be unrolled without impact on the other instances of statements S1 and S2, e.g., in the areas/code fragments corresponding to area 1010, 1012, 1016, and 1014.

As shown in FIG. 10, for a fusion of two statements S1 and S2, when the statements are separated out, 5 different domains 1010-1018 and corresponding schedules 1020-1028 are generated by extracting the kernel in the representation of the fused statements. This is done by providing a separate domain and schedule for each of the boundary portions 1030-1036 of the fused statements where only one statement applies, and a separate domain and schedule for the kernel 1040 where both statements apply.

As a result, the program loop view of the source code includes separate representations for each statement, as well as the kernel, upon which code generation optimizations may be applied by the code generation optimizer/parallel detection module 860. For example, code generation optimizations such as simplification and unstretching, if hoisting, substitute modulo, loop unrolling, etc. may be applied to the program loop view to obtain lower control overhead of the code. The program loop view may then be rescanned and converted back to a program statement view via the reentrance path after having undergone code generation optimizations by the. The result of the reentrance path is a program statement view of the code generation optimized program loop view that may be operated upon to provide even further optimization through an iterative process.

The optimizations that may be performed on the program loop view of the program, i.e. the "code generation optimizations," may be applied by code generation optimization/parallel detection module 860 in FIG. 8 to the program loop view 850 of the program. These code generation optimizations are performed on the polyhedral abstract syntax tree (AST), or the program loop view, and generate a new polyhedral AST, i.e. a new program loop view 850 for re-entrance to the program statement view 820 and/or emission back to the compiler 805. The code generation optimizations represent a set of transformations that are performed in an iterative, modular, and flexible manner to help generate the code with the least impeding control overhead as possible. An important property of the code generation optimizations is that they do not change the program order in the original polyhedral AST of the program loop view. They may induce statement splitting or aggregation and may even modify domain and schedule components. However, they do so in a transparent manner ensuring the strict equivalence of the relative orders induced by the new schedules for all instances of all statements.

When considering program correctness, it is straightforward to realize that different scheduling functions may produce the exact same execution. Indeed, only the relative execution order of all instances of statements is required. Therefore, a simple transformation like the shifting of all the statements by the same amount does not change any relative order of any statement instance and is said to produce equivalent schedules. Equivalence is a relation between two programs P and P' with respective global schedules $S_{ch}$ and $S_{ch}'$. When a schedule transformation is applied to P, the resulting program P' bears the exact same statements. Thus, program schedule equivalence is implied by program equivalence. This notion must be preserved by any code generation optimization or transformation performed by the code generation optimization/parallelism detection module 860 in FIG. 8.

With this requirement in mind, each code generation optimization or transformation executed by the code generation optimization/parallelism detection module 860 takes two arguments: (1) a list of nodes in the program loop view referred to by prefix vectors in the program loop view of the program; and (2) a propagation mode that can be, but is not limited to, "any" (all the nodes in the AST are visited), "prefix" (all the children of the given node are visited), or "exact" (only the specified node is visited). The list of nodes, i.e. the prefix vector list, is made up of prefix vectors for the nodes that are to be optimized by the particular code generation optimization selected. The nodes of the AST of the program loop view, e.g., the nodes 720-750 in FIG. 7C, may be characterized as a vector of numbers which indicate its path from the root (top-most) node. This vector of numbers is referred to as the prefix vector for the node.

The list of nodes may be made up of a listing of such prefix vectors. The prefix vector list defines the scope of the code generation optimization in that it indicates where the code generation optimization is allowed to modify nodes. Traversals of this list of nodes may be performed, for example, by a depth-first-search listing a parent before any of its children, a depth-first-search listing a parent after each of its children, a depth-first-search listing leaves only, or the like.

A code generation optimization may be called by the mechanisms of the illustrative embodiments, such as by the code generation optimization/parallelism detection module 860 in FIG. 8 either automatically or in response to a user request for a particular code generation optimization, to operate on individual statement instances, and/or sub-statement instances, in the program loop view 850 using a call such as "CG_codegenopt(optName, P, preftype), where optName is the name of the code generation optimization that is to be applied, P is the prefix vector list that will serve as a basis for flagging nodes in the AST to which optimizations are to be applied, and preftype specifies the prefixes found in P are to be treated as exact filters or prefix filters, i.e. "any," "pref," or "exact." For example, the call "codegenopt(simplify, {{1}, {2,0}, {3,3,3}}, BMT_exact)" will try to simplify exactly the nodes at the specified list of vectors in the AST of the program loop view.

The types of code generation optimizations that may be applied to the AST of the program loop view are varied and evolving. A current listing of code generation optimizations includes, but is not limited to, simplify, simplify-unstretch, simplify-trivial-modulo-remapping, extract-kernel, if-hoist/if-hoist-gentle, if-hoist-brutal, substitute-modulo, and loop-unroll. The simplify code generation optimization is a basic simplification under context, normally called from inside the code generation optimization module. The simplify-unstretch code generation optimization is a more elaborate simplification that also reverts any "domain stretching" phase that prevents over-separation in the code generation optimization phase when non-unimodular schedules are present. The simplify-trivial-modulo-remapping code generation optimization is a basic simplification plus explicit instantiation of equalities propagated to the leaves which results in either disproving or simplifying modulo conditionals. This can be viewed as a constant propagation for modulo guards that may also disprove some statements when the modulo guards cannot be met.

The extract-kernel code generation optimization computes and extracts a fully unrollable kernel from a loop with complex bounds (min, max, floor, and ceiling). This usually results in 0+ prologues, 1 kernel and 0+ prologues and may yield code bloat if not done carefully. The if-host/if-hoist-gentle code generation optimization walks the children of the given node and finds conditions on the current loop's depth and hoists them. The if-hoist-brutal code generation optimization walks the leaf nodes, finds any condition on any depth smaller than the current loop's depth and brutally hoists everything. The substitute-modulo code generation optimization simplifies modulos aggressively without taking care of compatibility within different statements. When all statements in a loop have the same modulo substitutions, this is a powerful tool to embed the modulos into the enclosing loops' bounds. The loop-unroll code generation optimization performs a full unroll of a loop with static constant bounds difference. This code generation optimization should usually be preceded by an extract-kernel and a if-hoist-gentle code generation optimization if the bounds are complex (min, max, floor, ceiling) otherwise many inner conditionals may be generated. These are only examples of currently known code generation optimizations and not intended to be limiting in any way. Other code generation optimizations may be used in addition to, or replacement of, the listed code generation optimizations without departing from the spirit and scope of the present invention.

When applying the code generation optimizations using the code generation optimization/parallelism detection module 860 in FIG. 8, based on the prefix vector list and the propagation mode, a first pass is performed on the program loop view, e.g., the AST of the program loop view, to flag the nodes that need to be processed. The reason why a separate pass is used to mark the nodes is that some optimizations/transformations may duplicate nodes while some others may delete nodes, making the prefix vectors obsolete very quickly. Thus, prior to any code generation optimization/transformation being performed, the nodes that are to be processed are first flagged.

After having flagged the nodes to be "visited" by a code generation optimization/transformation, a code generation optimization/transformation application algorithm is executed by the code generation optimization/parallelism detection module 860 in FIG. 8 to thereby apply the called code generation optimization/transformation. FIG. 11 is an example of pseudocode of an algorithm for applying code generation optimizations/transformations. All code generation optimizations/transformations share the same template implementation based on visitors. Visitors are instantiated at 3 different points in the algorithm. First, a visitor is used to perform an outermost scan of the nodes in the AST of the program loop view. Each code generation optimization scans the nodes that have been marked by the filtering pass. For each marked node N, the code generation optimization applies its core function which determines if the node's domain is modified and returns the list of new domains to replace the obsolete ones. This list is sorted with respect to the current time dimension under the parent polyhedral context with the same algorithm proposed by Quillere, referenced above.

The core function is the second point where an inner visitor is instantiated. Each new domain in the list then generates a new node N' and its corresponding subtree, which is a copy of the subtree rooted at N and simplified in the context of N'. Once the new subtree list is attached in place of the original node N, the propagation function is called along each path to every new leaf. Such propagations are performed by a third inner visitor that may void nodes in the new subtrees which need to be removed recursively in a bottom-up order. To avoid interfering with the outer visitor traversal, special care is taken. Therefore, the node removal function is implemented with a boundary node argument and is only allowed to delete descendents of that node. This guarantees that the outer application visitor and the inner propagation visitor are always operating on non-conflicting regions of the AST.

Some of the above example code generation optimizations that may be implemented using the mechanisms of the illustrative embodiments will now be described in greater detail. It should be appreciated that while specific code generation optimizations are described herein, the illustrative embodiments are not limited to these code generation optimizations and may operate to implement other code generation optimizations in addition to, or in replacement of, one or more of the herein described code generation optimizations.

As mentioned above, one of the code generation optimizations that may be performed by the code generation optimization mechanism of the illustrative embodiments is the conditional hoisting, or if-hoisting, code generation optimization. Conditional hoisting performs a controlled tradeoff between code size growth and spurious inner conditionals removal. The core function determines all spurious conditionals for a marked node and factorizes them.

Two application modes are possible when processing a node N of depth d. In the least aggressive mode, the visitor traverses all the children of node N. The visitor looks for conditionals directly expressed as a function of $(t_i)_i \in_{[1,d]}$ and constants only. Such constraints do not concern the time iterators at depth d'>d and are thus, affine guards that can be hoisted. In the aggressive mode, the visitor traverses only the leaf nodes under node N and performs a polyhedron projection of each separate statements' domain on the vector space $(t_1, \ldots, t_d, N)$. A subsequent simplification in the context of the parent node yields the new conditionals.

In both modes, the non-redundant list of conditionals is maintained. Eventually, the difference is computed with the reference node's domain, yielding the core list of conditionals representing all possible case distinctions. In each of these cases, a single condition holds. As an application, consider the following variants with the different conditional hoisting modes as shown in FIGS. 12A-12C. FIG. 12A represents the original code. FIG. 12B represents the same code with a gentle, or least aggressive, mode of conditional hoisting having been performed. FIG. 12C represents the same code with an aggressive mode of conditional hoisting having been applied.

As one can see, FIG. 12A includes several conditional statements, i.e. the three "if" clauses in FIG. 12A, that will execute at each iteration of the outermost t1 loop, even though the condition associated with the conditional statement will evaluate to true for only one or two iterations of the entire t1 loop iteration. This represents a significant overhead, which can be removed the conditional hoisting optimization. While in general the aggressive technique can get rid of more conditional statements at the cost of more replication, one can see that in this case, the gentle approach (result shown in FIG. 12B) was sufficient to remove all conditionals. The aggressive technique (results shown in FIG. 12C) also resulted in all of the conditionals being removed, but resulted in more code than the gentle approach.

In most cases, the gentle mode is enough and yields potentially much smaller code. In special cases, however, the more aggressive, or "brutal," mode is needed to perform more advanced conditional hoisting, such as in the case of loop unrolling after tiling. To see that program equivalence is preserved is rather straightforward. Conditional hoisting is actually a domain splitting on the time dimensions. Suppose I and I' are ordered instances of two statements that execute respectively at time t and t' such that $t \leq t'$. Two cases arise: (1) both instances belong to the same new split domain after transformation and their order is enforced by the schedule; and (2) each instance belongs to a different sub-domain, in which case the relative order is enforced by the disjunction and the subsequent ordering. Lastly, since the difference is computed with the reference node's domain, no iteration is lost.

Another code generation optimization/transformation that may be applied to the program loop view 850 in FIG. 8 by the code generation optimization/parallelism detection module 860 is the kernel extraction code generation optimization/transformation. When loop optimizations/transformations such as skewing or strip-mining are applied, the generated loops exhibit complex bounds which can degrade performance or prevent further desired loop unrolling. Kernel extraction is a transformation that enforces the separation of such complex bounds in different versions of the loops. This transformation has three versions: (1) the unrollable kernel extraction detects pairs of lower/upper bounds that exhibit a static constant difference; (2) the lower bounds kernel extraction creates a list of conditionals where every lower bound is minimal exactly once. If at depth d, the scattered, separated domain exhibits $t_d \geq (l_i)_i \epsilon_{[1,k]}$, the resulting conditionals are a list of k elements such that $t_d \geq (l_i)_i \epsilon_{[1,k]-\{j\}} > l_j$; and (3) the upper bounds kernel extraction creates the same list of conditionals with the upper bounds, i.e. $t_d \geq (u_i)_i \epsilon_{[1,k]} => t_d \geq (u_i)_i \epsilon_{[1,k]-\{i\}} > u_j$.

The result of a simple example is shown in FIGS. 13A-13C. FIG. 13A represents the original code of the depicted example. FIG. 13B illustrates skewing of the original code along a first dimension. FIG. 13C illustrates a result of the kernel extraction code generation optimization/transformation. in the kernel extraction code generation optimization/transformation, the program equivalence property is obtained the same way as in the conditional hoisting code generation optimization/transformation. Kernel extraction may be followed by a subsequent loop unrolling pass. This transformation (loop-unroll) performs full unrolling of the iterations of a given node. Given its natural code expansion characteristics, is applied at the innermost depths.

As shown in the example of FIG. 13A, there is a simple statement inside a doubly nested loop. FIG. 13B shows this same statement after loop skewing optimization was applied. Loop skewing is most often used to parallelize code by modifying the order in which statements are executed so that the dependencies present in the original code do not hinder parallelization of the inner loop(s). The salient observation is that in FIG. 13B, there are minimum (min) and maximum (max) functions in the loop bound computation of the innermost loops. These min/max functions were introduced by the loop skewing optimization, and their cost may significantly impact on the execution time of the loop. Using the kernel extraction of the illustrative embodiments, the domain of execution of the outer loop may be split so that the min(X, Y) function always takes its X value in one of the copy of the outermost loop, or Y value in the second copy of the outermost loop, in FIG. 13C. Because of this property, the min function may be safely removed from the code as it is statically known that the smallest number will come from the X value in the first instance of the loop and the Y value in the second instance of the loop.

In addition to code generation optimizations, the code generation optimization/parallelism detection module 860 in FIG. 8 further detects parallelism in the program loop view 850. When specifying parallelism at the schedule level only, there is a semantic gap between the syntactic loop model and the schedules that are expressed with the polyhedral model. One such example, is given in FIGS. 14A-14C for 2 statements with the same domain Dom={i in [1,N]}, with only the A and Beta parts shown. A and Beta are two components of the schedule associated with each of the statements. The schedule essentially associates a time stamp, e.g., date, time, etc., with each instance of the statements. These time stamps indicate which of the instances of a statement comes first in the execution of the code. Having a smaller time stamp number means that that instance of a statement comes prior to another instance that has a higher time stamp number. The A matrix indicates how each of the iterations surrounding a statement are taken into account to compute that statement's time stamp. The Beta part indicates the order in which a statement is to be found in the code. For example, a Beta of [0, 0] associated with statement S1 in FIG. 14A states that S1 is the first loop and is the first statement inside that first loop.

Figure 14B:
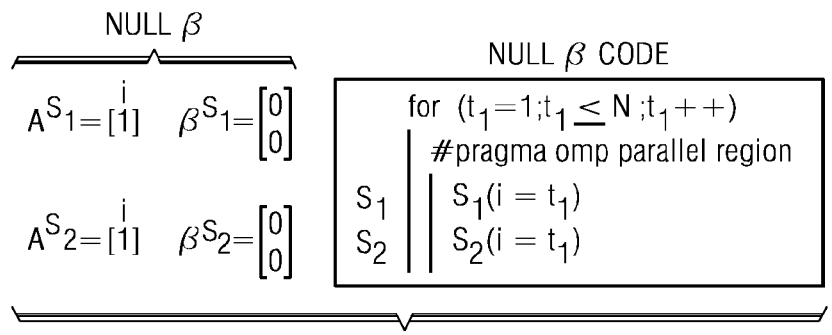
Figure 14C:
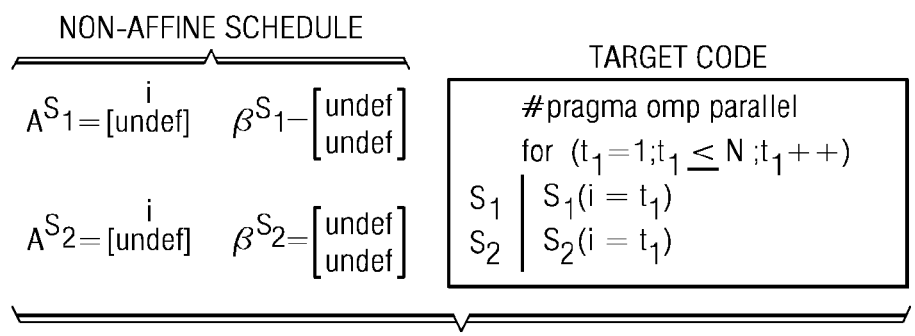

Suppose that the target version shown in FIG. 14C is to be generated and the dependencies between statement S1 and S2 allow it to be generated. However, if parallelism is to be expressed in the schedule directly, the code in FIG. 14B is obtained where the parallel loops undergo a fission optimization. In other words, to express parallelism in the way proposed in FIG. 14A, a loop fission operation, i.e. statements inside a single loop nest are separated into two or more loops each containing a subset of the statements inside the original loop, is applied. This loop fission will have significant impact on the performance of the code.

On the other hand, enforcing the fusion of the loops yields the code in FIG. 14B where only the body of the loops is parallel. The parallel fused version requires the schedule to specify the same arbitrary order on the outermost time iterator for the two statements while still enforcing sequentiality between S1 and S2 at the loop independent level. Eventually, the constraints borne by the syntactical parallel version are not expressible with a polyhedral schedule only, as shown by the "undef" labels inside of the A and beta representation in FIG. 14C, which represent the desired code for which the above scheme to express parallelism within the polyhedral A and Beta scheduling matrices cannot be used.

This expressivity issue is alleviated by the illustrative embodiments by means of a code generation optimization/transformation to detect parallelism. When it is applied to a node N of depth d, it creates a list of all statement leaves with their restricted domains after separation. This list is used to filter the dependence graph and to check if node N defines a loop which does not bear any dependence. Each dependence is intersected with the current schedule of its source and target statements but also with their restricted domains. If the resulting polyhedron is not empty, the algorithm stops when a parallelism preventing dependence on depth d is found. On the other hand, if all resulting dependences are empty, the loop is marked parallel and an OpenMP directive along with the shared and private variables information are generated. OpenMP used here is an exemplary compiler and runtime support system that enable parallelism to be expressed. OpenMP uses directives (generated either by the application user and/or the compiler) that state which loop/region can safely be executed in parallel. OpenMP is used herein as only an example and is not limiting to the mechanisms of the illustrative embodiments in any way. To the contrary, in one illustrative embodiment, OpenMP is only used as one way to convey parallelism information to the remainder of the compiler/runtime system of the illustrative embodiment. Any other parallel compiler/runtime system may be used without departing from the spirit and scope of the illustrative embodiments.

All this processing is performed by the core function of the code generation optimization/parallelism detection engine

860 in FIG. 8 which never modifies the constraints on the domain of node N, but rather sets a parallel bit to 1 in the internal representation associated with the loop. When it becomes time to emit the code, e.g., from emit module 880 in FIG. 8, a parallel bit will be read to determine, for each loop, whether this loop is parallel or not. Upon a determination that the loop is parallel, the emit module 880 will generate the appropriate construct to inform the rest of the compiler/runtime system that this loop is a parallel loop. In one illustrative embodiment where OpenMP is used, this consists of emitting a pragma directive just prior to the loop.

Returning again to FIG. 8, as shown, the result of the code generation optimizations and parallelism detection is a modified program loop view 850 that is then either output to the compiler 805 or sent along a re-entrance path to the polyhedral rescan module 870 for conversion back into a program statement view 820 for further optimization. Determination on whether to go along the re-entrance path or not depends on various factors. First, it may be desirable to transform the code to the program loop view 850 representation before completing all optimizations in the program statement view 820 representation in order to gather some knowledge about the code. For example it may be desirable to use the program loop view 850 to determine which loops are parallel, to see if kernels need to be extracted, to evaluate the complexity of the current code, and/or any other qualitative information that may be gathered from the program loop view 850 representation. Once this information is gathered, it is desirable to go back to the program statement view 820 representation to exploit this additional knowledge for further optimization of the code upon determination, based on this additional knowledge, that particular optimizations are advantageous.

Second, it may be desirable to apply all optimizations in the program statement view 820 representation at once. In this framework, some loop optimizations from the loop optimization module 830 may be applied and then the program statement view 820 representation may be converted to the program loop view or AST 850 representation. Specific code optimizations may be applied by the code generation optimization/parallel detection module 860, such as kernel extraction and/or other code generation optimizations, and then the re-entrance path may be traversed to go back to the program statement view 820. Further optimizations of specific aspects of the program loop view or AST 850 representations (after being modified by the code generation optimizations) may then be performed. Both approaches above are not exclusive and may be jointly applied or applied repetitively in some alternating fashion.

With regard to the re-entrance path, the modified program loop view 850 is parsed by the polyhedral rescan module 870 and data structures expected in the program statement view 820 are recreated from the modified program loop view 850. In this way, iterative calls to the loop optimizer module 830 and the code generation optimization/parallelism detection module 860 may be performed successively until a desired level of optimization is achieved at which time the optimized code may be output back to the compiler 805. This is contrary to known mechanisms in which a single pass of the loop optimizer module 530 in FIG. 5 is performed with some minor optimizations being performed on the entire program thereafter just prior to the emitting of the code back to the compiler. No successive iterations are possible in known mechanisms.

In order to perform successive (iterative) calls to the optimizing framework comprising the loop optimizer module 830 and the code generation optimization/parallelism detection module 860, the output of a given polyhedral optimization must be fed to the next phase without disrupting the properties of the optimization found so far. In particular, if no further optimization is performed in the latter phase, one expects the result to exhibit the same properties, i.e. parallelism, memory locality, code size, control flow overhead, etc., as have been observed in the previous phase. That is, for example, the output of the code generation optimization/parallelism detection module 860 should have the same properties as the input to the code generation optimization/parallelism detection module 860. In other words, the re-entrance process must be stable by imposing the following constraints: (1) the code size must not increase; (2) the amount and granularity of parallelism must not be modified; and (3) the relative execution order of all statements in the program must be preserved. Memory, or data, locality and reuse are strongly tied to the scheduling of the program and thus, no particular concern occurs with respect to these features. On the other hand, code size and control flow overhead are very dependent on the code generation optimizations and the aggressiveness of the transformations, such as conditional hoisting or modulo guard removal. Furthermore, when parallelism is directly expressed in the schedule, such as via the parallelism detection mechanisms of the code generation optimization/parallelism detection module 860, it may be hard to exploit properly at the syntax tree level and even harder to reparse properly.

In practice, the mechanisms of the illustrative embodiments apply transformations that will change the representations 820 and 850. However, from an implementation perspective, even if no transformations are applied, the quality of the representation is not degraded by the reentrance path. In other words, if the reentrance path is followed to apply a specific sequence of loop and code generation optimizations, which will result in a faster running code, but in the process degrade the representation which happens to slow the resulting code, then such degradation must be weighed against the benefit (better optimization). However, by practically ensuring that there is no degradation of representation while exercising the re-entrance path, as in the mechanisms of the illustrative embodiments, the cost of implementing the mechanisms of the illustrative embodiments with regard to code performance is approximately zero. Thus, the re-entrance path of the illustrative embodiments should always be exercised if the compiler/application writer can determine a beneficial loop/code generation optimization sequence.

With the mechanisms of the illustrative embodiments, the polyhedral rescan module 870 performs program regeneration in order to generate the program statement view 820 from the program loop view 850. Program regeneration involves transforming the modified or new AST of the program loop view 850 into a stable program with respect to code generation. In order to generate a stable program, each statement in the new stable program needs to have its own domain that does not overlap with other instances of the same original statement. Each schedule must enforce the same relative order with respect to all other instances of any other statement. Furthermore, subsequent call to a separation algorithm in the program statement view optimizations of the compiler should result in the same AST as originally presented to the code generation transformations. In order to achieve all of these goals, schedule reconstruction, domain reconstruction, and domain stretching transformations are performed to generate a new stable program. This new stable program may be fed back to the program statement view stage of the compiler for further optimizations by the program statement view optimizations.

Figure 15:
FIG. 15 is an exemplary diagram illustrating a transition graph for iterative polyhedral loop transformation optimizations in accordance with one illustrative embodiment.

As discussed above, the loop optimizer 830 applies polyhedral transformations to the program statement view 820 of the program or source code. The code generation optimizations, on the other hand, have the sole purpose of reshaping the AST of the program loop view 850 for lower control flow overhead. These latter transformations do not modify the program semantics in any way although they may result in different equivalent schedules after regeneration via the re-entrance path. Assume that the original program source code is referred to as P, the AST of the program loop view 850 is $AST^P$, the code generation optimizations used to generate the $AST^P$ are denoted $P_{CG}$, and the stable program generated from the $AST^P$ using regeneration is P'. Using this notation, the transition graph for the iterative polyhedral loop transformation optimizations of the illustrative embodiments is shown in FIG. 15 where the goal, which is achieved by the illustrative embodiments, is to ensure $AST^P \equiv AST^{P'}$ in order to build a stable, reentrant and iterative framework that does not rely on any other part of the global compilation chain to iterate.

Figure 16A:
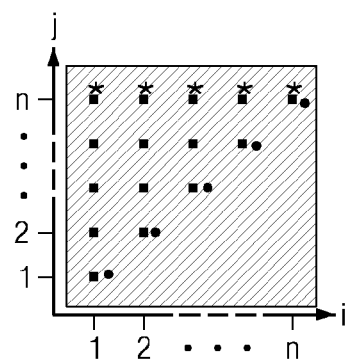

Consider a simple code fragment such as shown in FIGS. 16A-16C, with statements S1, S2, and S3 covering the iteration points depicted in the graphs below the code fragments. Considering the code in FIG. 16A, a typical representation of this program generated by the loop optimizer module 830 is shown in FIG. 16B. Polyhedral code generator algorithms of the code generation optimization/parallelism detection module 860 isolate the i==N data point from the others. After one or more iterations of the loop optimizer module 830 and the code generation optimization/parallelism detection module 860 using the optimizations described above, and without imposing the stability requirements discussed herein, the code shown in FIG. 16C is obtained where additional data points have been isolated.

FIGS. 16A-16C illustrate the large code growth that may occur as a byproduct of successive polyhedral rescan operations by the polyhedral rescan module 870 and the successive operation of the code generation optimization/parallelism detection module 860. This code growth will obviously impact the quality of the final code. In addition, by looking carefully at FIG. 16C, one notices that all the conditionals have migrated from inside the loops to the top level (outside of any loops). This is a hard to reverse process that may prevent other optimizations from being performed.

This code bloat and conditional migration occurs because of the following reasons. Each time that the code goes through a polyhedral regeneration operation, and the statements are split, the subsequent polyhedral code generation operation by the polyhedral code generator 840 has less flexibility to combine the same original statements into convex areas with uniform sets of statements within itself. For example, in FIG. 16B, all the statements are under a unique "for i" loop because there are instances of S1/S2/S3 in the full i=1 . . . n range. Consider what happens to S1 the next time around. The original S1 has been split into 3 distinct S1.1, S1.2, and S1.3 sub-statements with, respectively, ranges for i=1 . . . n-2, i=1 . . . n-1, and i=n. These distinct ranges will result in a top-level conditional with the resulting replication seen in FIG. 16C. Thus, what is needed is a way to control this replication in order to prevent highly optimized code with poor single thread performance due to instability conditions that leads to highly duplicated code with a high degree of redundant replication and control overheads.

This goal is achieved by the mechanisms of the illustrative embodiments by recombining instances of statements prior to the polyhedral rescan operation being performed so as to prevent the code growth shown in FIG. 16C. These mechanisms are heuristically driven in that none of the operations discussed hereafter are necessary but, if followed, the code growth for the particular statement operated will be prevented.

In order to perform this recombining of instances of a statement, an operation is performed, such as by the polyhedral rescan module 870, on the new AST generated by the code generation optimization/parallelism detection module 860. As discussed above, the AST is an encoded hierarchical ordered graph where each inner node corresponds to an iteration domain at a given depth in the loop nest structure. Each leaf node has also a list of statements that are enclosed by the loop nest. For a given node N at depth d in the AST, the node is associated with a domain $D^N$, which is a polyhedral representation of the domain associated with the enclosed statements, and projected to reflect the depth d of the node in the AST.

The requirements imposed by stability under the separation algorithm are less straightforward. Consider a node N of depth d in $AST^P$. If its scattering domain $D^N$ projected on depths 1 . . . d−1 and simplified under the parent domain is not the universe domain, it means node N holds constraints that can be hoisted. A hoistable condition is a constraint at depth j appearing in a polyhedron of depth k in the AST such that j<k (i.e. a constraint in which the time dimension k does not appear in the constraint). Recall that the time t is represented by a vector of time elements, with a lexicographical interpretation of the times. In the above statement, it is stated that a constraint in the time dimension k does not appear if the k's position in the vector (starting from the left) is null. If such constraints were to appear in the regenerated program, they would trigger the same separation behavior from Quillere's algorithm as shown in FIG. 16A-16C. In turn, this would result in the code bloat as shown in FIG. 16C. Therefore, in order to perform a stable polyhedral rescan operation to generate the program statement view 820 from the newly optimized program loop view 850, the polyhedral rescan operation must not specialize a statement's representation past any node containing such a hoistable condition.

Thus, the mechanisms of the illustrative embodiments use the following three phase operation to ensure stability of the program code being returned to the program statement view 820. A first pass on the $AST^P$ is used to detect the nodes containing hoistable conditionals by traversing the tree of the $AST^P$ in a depth-first search traversal order (i.e. visiting/processing each parent node before each of its own children. A parent, or father, node F is then marked as a boundary node for re-entrance if one or more of its direct children are detected as having one or more hoistable conditionals. Then, for each such boundary node of a given depth d, all the instances of a given statement S' are identified and a single compound statement S in P' is generated to represent them. The set of instances of S under parent node F is denoted $\{S_{inst}^F\}$ where inst implicity denotes an enumeration of the different instances of the given statement S under F. The new domain for the compound statement is set as $D^{S'}$=union over all instances inst(⊥dom iters $(D_{inst}^{SinstF})$.

In other words, the new domain associated with a given statement S is formed as follows. From node F, each of the leaf nodes (nodes without children) for which F is a (direct or indirect) parent is searched. The union of the domain associated with statement S at each of these leaf nodes is generated. This union of domain defines the final domain associated with statement S. The tradeoff with the above solution is that statements in P' do not correspond to the leaves of $AST^P$. This means that when the rescan process of the polyhedral rescan module 870 is complete, and the program loop view 850 has been successfully translated back into the program statement view 820, each part of the statements associated with each of the leaves under node F we will not be able to optimized separately as they will have been grouped together as a single statement in order to avoid the problem associated with the hoistable condition. However, the new $AST^{P'}$ resulting from application of the code generation optimizations is guaranteed to be the same syntax tree as the original $AST^{P}$. This means that by doing such grouping of statements under node F, the hoistable condition problem has been avoided and thus, the overall quality of the generated code has not been degraded by a cycle through elements 840 and 870.

Returning again to FIG. 8, as discussed above, after iterating the optimizations performed by the loop optimizer 830 and the code generation optimization/parallelism detection module 860 via the re-entrance path comprising the polyhedral rescan module 870 to achieve a desired level of optimization, the resulting optimized code must be emitted, by the code emitter 880, to the compiler 805.

Determination on whether to go along the re-entrance path or not depends on various factors. First, it may be desirable to transform the code to the program loop view 850 representation before completing all optimizations in the program statement view 820 representation in order to gather some knowledge about the code. For example it may be desirable to use the program loop view 850 to determine which loops are parallel, to see if kernels need to be extracted, to evaluate the complexity of the current code, and/or any other qualitative information that may be gathered from the program loop view 850 representation. Once this information is gathered, it is desirable to go back to the program statement view 820 representation to exploit this additional knowledge for further optimization of the code upon determination, based on this additional knowledge, that particular optimizations are advantageous.

Second, it may be desirable to apply all optimizations in the program statement view 820 representation at once. In this framework, some loop optimizations from the loop optimization module 830 may be applied and then the program statement view 820 representation may be converted to the program loop view or AST 850 representation. Specific code optimizations may be applied by the code generation optimization/parallel detection module 860, such as kernel extraction and/or other code generation optimizations, and then the re-entrance path may be traversed to go back to the program statement view 820. Further optimizations of specific aspects of the program loop view or AST 850 representations (after being modified by the code generation optimizations) may then be performed. Both approaches above are not exclusive and may be jointly applied or applied repetitively in some alternating fashion.

It is important that the code that is emitted back to the compiler 805 be of good quality even in the presence of highly optimized loop transformations, such as those of the illustrative embodiments, used for data locality and parallelism where statements are executed at "different speed" from the original program.

FIGS. 17A-17C illustrate an example of code optimization where two statements have had their speed accelerated by a factor of 3. FIG. 17A is an example of the original code having a complex schedule. FIG. 17B is an example of the original code after optimization and regeneration for emitting back to the compiler. As can be seen from FIG. 17B, obviously something very wrong occurred as the code size has been significantly increased. Thus, significant code bloat is again found with typical optimizations.

With the illustrative embodiments, to avoid such code bloat, a domain stretching operation is performed to augment the code generation optimization/parallelism detection operations that transform the program statement view 820 into the program loop view 850. This operation essentially normalizes the domains associated with each statement by stretching them to their largest possible values without adding any execution points, which would otherwise change the semantics of the program. As a result of this optimization, which may be typically implemented in the code generation optimization/parallelism detection module 860 for example, high quality output code may be generated while enabling a path in which a statement can be still meaningfully split into distinct sub-statements as previously described above. As discussed above, these sub-statements may then be optimized as if they were original statements in the original program, namely the full range of optimizations such as loop fusion, loop splitting, loop skewing, loop tiling, (non) unimodular loop transformations, and the like, may be applied to these sub-statements as well.

As discussed above, the schedule of loops in a program may be represented as a structured matrix having three sub-matrices: (1) the Alpha matrix, which represents the speed at which statements are fired along a given time dimension; (2) the Beta matrix, which represents the sequential interleaving of statements along the different loop depths; and (3) the Gamma matrix, which represents the constant parametric shifting along each time dimension. The values of the Beta matrix will differ for each instance of an original statement S. The values of this Beta matrix may be read from the inner data representation of the AST in either the program statement view 820 or the program loop view 850.

When the loop optimizer 830 accelerates a statement with respect to another, this yields a matrix Alpha with strides greater than 1 along with constant shiftings, and additional stability interplays occur with the Quillere separation algorithm. For example, as shown in FIGS. 17A-17B, both S1 and S2 are slowed by a factor 3 on a first time dimension and statement S2 is shifted by 1.

When considering the Alpha matrix, or A for short, transformations with stride greater than 1 along with shifting, the domains in the transformed space become very unfriendly for re-entrance. For example, consider the simplified schedules in FIGS. 18A-18F. Initially, scattering domains are constructed in the time (i.e. transformed) space by applying the schedule function to the iteration domain for each statement in the program. This step actually expands the size of the domain by a factor 3 producing the time bounds observed in FIG. 18B. The separation phase proceeds and yields the code obtained from the code generation optimization/parallelism detection module 860 as shown in FIG. 18C. Now, when the program P' is regenerated in FIG. 18D, the new iteration domains are obtained by shrinking back the separated time domains into the original space by a factor 3. The new expansion phase performed when reconstructing the new scatter domains in FIG. 18E returns different scattering domains that will be split further and make the code size grow as in FIG. 18F. It is also important to notice how the loop bounds on the first and last loops change between FIGS. 18C and 18F when using re-entrance and going back and forth from time space to original space. Actually, if no special care is taken, this process is recurrent at each regeneration attempt and stability will never be reached in the context of such Alpha matrix schedules.

Thus, the mechanisms of the illustrative embodiments define a new transformation, the scatter domain stretching transformation, to apply on domain constraints at scattering construction time. For each statement S the following operations are performed. First, the loop depth Ds associated with statement S is determined. Then the Hermite Normal Form (Hnf) matrix is calculated from the Alpha scheduling matrix. The Hermite Normal Form matrix is constructed using a standard matrix transformation (or linear algebra) that separates a given matrix X into a product of two matrices Y*Z, where Y is a matrix in Hermite Normal Form and Z is a unimodular matrix. The Hermite Normal Form Y matrix is a non-negative, non-singular, lower triangle matrix such that for each row i, the maximal element is $Y_{i,i}$ (i.e. the diagonal element is larger than any others on that row). A unimodular matrix is a rectangle matrix whose determinant is either plus or minus one.

The scattering matrix Theta is computed using Alpha, Beta, Gamma matrices, and the domain of the statement S. For each time dimension Td (from 1 to Ds) the following operations are performed. The stride factor is computed as Sf=Hnf[Td, Td]. Namely the stride factor is the diagonal element at row/column number Td in the Hermite Normal Form matrix. Upon a determination that the stride factor Sf>1 then a determination is made as to whether this stride factor Sf divides every component (i.e. time domain, and parametric dimensions) in the scattering matrix for every row that contains a non-null Td entry.

If this check succeeds, then proceed as follows for each domain constraints Cd that include Td. If Cd is determined to be a lower bound constraint of the form "f(time, parameters)>=const", then const is replaced by floor((const−1)/Sf)*Sf+1 in the original domain matrix. Alternatively, if Cd is determined to be an upper bound constraint of the form "f(time, parameters)<=const", then const is replaced by floor ((const+1)/Sf)*Sf−1 in the original domain matrix.

Once the above algorithm runs its course, the following post-processing is performed. The scattering matrix Theta is recalculated using Alpha, Beta, and Gamma matrices, and the modified domain. The resulting new scattering matrix is then void of the stretching constraint issue.

Note that the above example is only one exemplary way to process the time constraints, as they are alternative ways to derive some of the coefficients and/or other values that the constraints can be normalized to. Those of ordinary skill in the art will readily understand, in view of the present description, the manner by which the mechanisms of the illustrative embodiment may be modified for other implementations in which the coefficients and other values are represented differently. The present invention is not limited to the particular illustrative embodiments set forth above.

This transformation has the effect of stretching each constraint, encompassing into the domain every integer point of the time space that is strictly non integrate in the original space. It provides normalization for the scatter domains while guaranteeing that no new point is added to the original space. It further keeps the exact same number of executed instances for each statement while maximizing the overlapping of time domains.

The scatter domain with stretching transformation of the illustrative embodiments receives, as input, the Alpha, Beta, and Gamma matrices for a given statement as well as the domain for the statement. The scatter domain with stretching transformation outputs a modified scattering matrix Theta'. An example of pseudocode for implementing a scatter domain with stretching transformation in accordance with one illustrative embodiment is provided as follows:

```
Determine the loop depth Ds associated with statement S;
Compute the Hnf (Hermite Normal Form) matrix from the alpha matrix;
Compute the scattering matrix Theta using Alpha, Beta, Gamma, and Domain
for each time dimension Td (from 1 to Ds)
    stride factor Sf = Hnf[Td, Td] (the diagonal element at row/column number
Td in the Hermite Normal Form matrix);
    if stride factor Sf> 1 then
        check if this stride factor Sf divides every component (i.e. time domain,
and parametric dimensions) in the scattering matrix for every row that contain
a non-null Td entry;
            if this check succeeds, then
                for each domain constraint Cd that includes Td:
                    if it is determined that Cd is a lower bound constraint of the form
"f(time, parameters) >= const",
                        replace const by floor( (const−1) / Sf) * Sf+1 in the origina domain
matrix;
                    if it is determined that Cd is an upper bound constraint of the form
"f(time, parameters) <= const",
                        replace const by floor((const+1) / Sf) * Sf−1 in the original domain
matrix;
Recompute the scattering matrix Theta using Alpha, Beta, Gamma, and the
modified domain.
```

In the above pseudocode, the Hermite Normal Form matrix is a matrix obtained from using the known Hermite Normal Form decomposition method but which is restricted to the case of a single transformation, or at best to harshly constrained multiple transformations. The Hermite Normal Form matrix may be defined as follows: Given an integer matrix H of size m×n and full rank, H is in Hermite Normal Form if and only if H=[B 0] where B is a non-negative, non-singular lower triangular matrix such that for each row I, the unique maximal element is $b_{i,i}$ (i.e. ∀j<i, $b_{i,j}$<$b_{i,i}$). Moreover, in the above pseudocode, the generation of the scattering matrix Theta from the Alpha, Beta, and Gamma matrices, and the domain, is generally known in the art.

FIGS. 19A-19B illustrate the scattering domains for S1 and S2 and resulting stable $AST^{P'}$ obtained using the scatter domain with stretching transformation of the illustrative embodiments. The overlapping portion of the scattering domains is much friendlier to re-entrance stability but will still generate a cut for statement S2 and 3N+3≦t1≦3N+4. However, this cut is actually non-integral in the original dimension and it will indeed be removed from the resulting program loop view 850, i.e. $AST^{P'}$. While domain stretching is described as a transformation for re-entrance, it also provides very efficient reduction in the number of separations performed by the separation phase because it helps in avoiding spurious border cuts.

FIGS. 20A-20C illustrate an example of domain stretching under re-entrance in accordance with one illustrative embodiment. This example considers the schedule equations:

$$i \in [1, M] \wedge t_1 = 3i + 2Mt_2 = 3i + 3M$$

The respective scatter domains are thus: $2M+3 \leq t_1 \leq 5M+2 \wedge 3M+3 \leq t_2 \leq 6M$. This in turn yields, after stretching: $2M+3 \leq t_1 \leq 5M+2 \wedge 3M+3 \leq t_2 \leq 6M+2$. While the constraints on t2 have been successfully stretched and will provide less opportunities for separation with other statements, the ones on t1 could not be stretched because of the statically unknown value of 2M %3. Under such schedules, the interleaving of the statements changes with the values of 2M %3 and cannot be expressed without outermost modulo case distinction. However, no disruption on the re-entrance stability is experienced as can be seen from FIGS. 20A-20C. The reason behind the stability is that the stretched loop bounds are parametric and cover all the different modulo cases with a single expression. The lack of knowledge of the exact modulo remainder forces the domains to overlap and does not generate spurious cuts.

FIGS. 21-24 are flowcharts that illustrate various operations according to the illustrative embodiments. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

Figure 21:
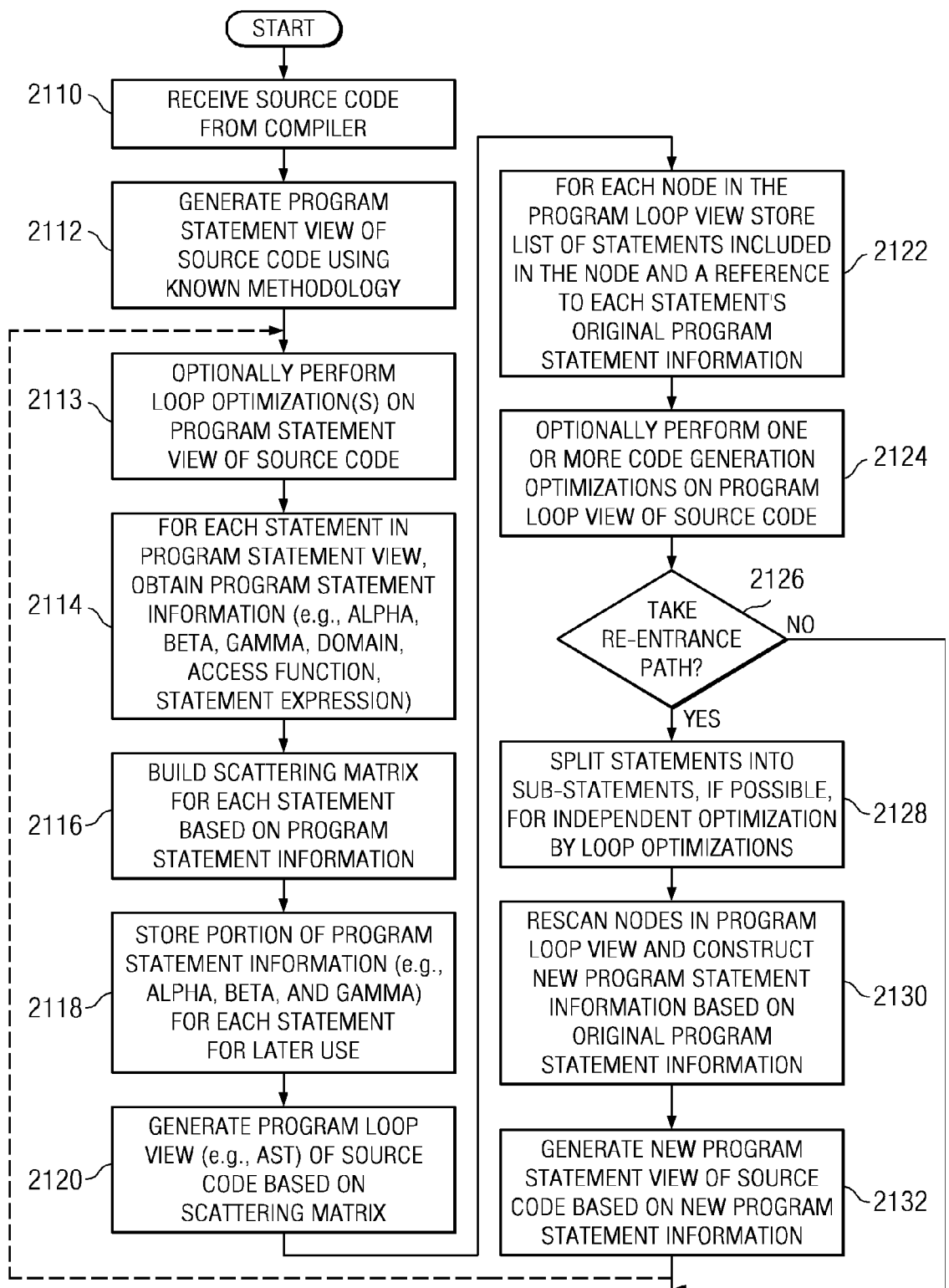
FIG. 21 is a flowchart outlining an exemplary operation for utilizing a re-entrance path to obtain further optimization of code in accordance with one illustrative embodiment.

FIG. 21 is a flowchart outlining an exemplary operation for utilizing a re-entrance path to obtain further optimization of code in accordance with one illustrative embodiment. The operation outlined in FIG. 21 may be performed, for example, by a polyhedral loop optimization mechanism, such as element 800 in FIG. 8 described above. The polyhedral loop optimization mechanism may work in conjunction with a compiler, such as compiler 805 in FIG. 8, to optimize source code in an iterative manner using a re-entrance path of the illustrative embodiments. The optimized code may then be provided back to the compiler 805 for use in generating executable code for execution on a computing device, such as server 304 or client 310 in FIG. 3, or the like.

As shown in FIG. 21, the operation starts with source code being received from the compiler (step 2110). A program statement view of the source code is generated using a known methodology (step 2112). For example, as discussed above, a known polyhedral scan operation may be performed on an intermediate representation of the source code to generate a program statement view of the source code. One or more loop optimizations are then optionally performed on the program statement view of the source code (step 2113).

For each statement in the program statement view of the source code, program statement information, such as the Alpha, Beta, and Gamma matrices, the Domain, Access Function(s), and the statement expression, are obtained (step 2114). A scattering matrix is built for each statement based on the program statement information (step 2116) and a portion of the program statement information, such as the Alpha, Beta, and Gamma matrices, for example, is stored for later use (step 2118). It should be noted that the present invention is in no way limited to a specific representation of the scheduling function associated with a given statement. The Alpha, Beta, and Gamma matrix structure is used herein as one example embodiment for illustrative purposes only. Many other types of representations may be utilized without departing from the spirit and scope of the present invention. For example, other possible representations may include a unified matrix representing the scheduling information that maps a specific iteration to a specific (possibly multi-dimensional) date or the like.

A program loop view, or AST, of the source code is generated based on the program statement view and the scattering matrix (step 2120). For each node in the program loop view, a list of statements included in the node is stored and a reference to each statement's original program statement information is also stored in association with the node (step 2122).

One or more code generation optimizations may be performed on the program loop view (step 2124) and a determination is made as to whether the re-entrance path is to be taken (step 2126). As mentioned above, the decision to take the re-entrance path is dependent upon the particular circumstances and whether or not re-entrance will be beneficial to the overall optimization of the code. This decision may be made based on user input or an automated mechanism, as discussed previously above.

If the re-entrance path is not to be taken, then the operation terminates. If the re-entrance path is to be taken, then the statements in the nodes of the program loop view are split, if possible, into sub-statements upon which loop optimizations may be performed individually (step 2128). The nodes, which may include the split sub-statements, are then rescanned to construct new program statement information (step 2130). The rescanning of the nodes in the program loop view may involve, for example, selecting a set of boundary nodes. The set of boundary nodes may be a set of interior nodes (node with children) provided none of the interior nodes have parent nodes that are already a boundary node or a set of leaf nodes (node without children) provided that nod of the leaf nodes have parent nodes that are already boundary nodes. Then for a given boundary node B at depth d in the program loop view, for each statement S associated with B, new program statement information is constructed as follows. The Alpha and Gamma matrices are maintained the same as they were for the original statement S (as stored by step 2118). The Beta matrix is reactualized to reflect the ordering in the program loop view. For example, if a beta value in the Beta matrix is 1, the depth d is set to the node number at each level in the program loop view. If a beta value in the Beta matrix has a value of the depth d+1, the last beta value is set to the corresponding value in the original beta values associated with S and stored in the program loop view. The domain may then be constructed as the union of all the domains associated with leaf nodes that contain S and have node B as a parent node.

The new program statement information is then used to generate a new program statement view of the source code (step 2132). This new program statement view of the source code may then be subjected to additional loop optimizations, converted into a new program loop view of the code to which additional code generation optimizations may be applied, and the like, in an iterative manner, if desired. The operation then either terminates if no further optimization is required or returns to step 2113 if further optimization is desired.

It should be noted that the above embodiment is only one possible application of a scheme in which a code generation step (such as the AST generation in step 2120) is used in order to split original statements for further optimizations in a Program Statement Representation. Alternative embodiments could simply build an AST and analyze it using some generic inspector in order to determine suitable cuts directly in the original Program Statement Representation. While it is believed that the process in FIG. 21 is an efficient way to proceed, such alternative process generating an AST or similar code representation followed by an inspection phase to split statements in the original Program Statement View are equally applicable and suitable in some implementations of the present invention.

Figure 22:
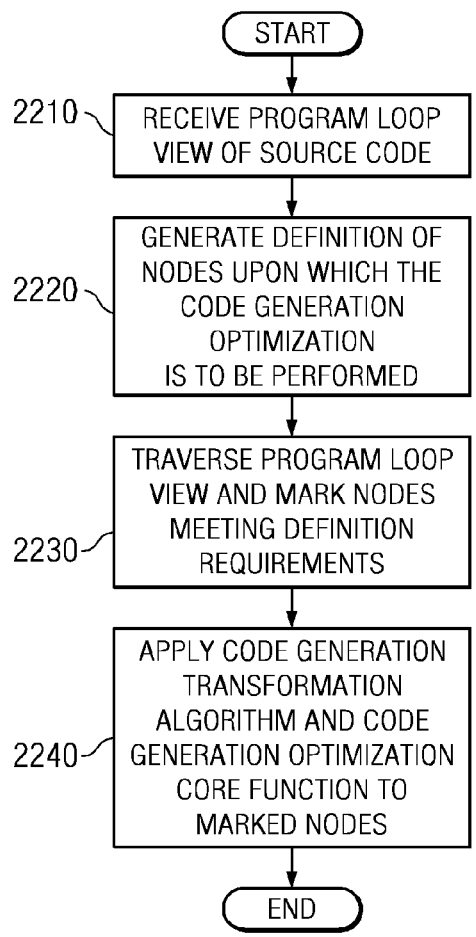
FIG. 22 is a flowchart outlining an exemplary operation for applying a code generation transformation algorithm in accordance with one illustrative embodiment.

FIG. 22 is a flowchart outlining an exemplary operation for applying a code generation transformation algorithm in accordance with one illustrative embodiment. The operation outlined in FIG. 22 may be performed, for example, as part of the step 2124 in FIG. 21. It should be appreciated that the operation outlined in FIG. 22 may be performed for each of a plurality of code generation optimizations.

As shown in FIG. 22, the operation starts with receiving the program loop view of the source code (step 2210). This may be obtained, for example, from step 2122 in FIG. 21. A definition of the types of nodes in the program loop view to which a particular code generation optimization is to be applied may be generated (step 2220). It should be appreciated that such a definition may have been previously defined prior to the operation outlined in FIG. 22 being executed, for example. The nodes of the program loop view are then traversed to mark the nodes meeting the definition for the code generation optimization (step 2230). The code generation transformation algorithm is then applied such that the code generation optimization core function is applied to the statements in the marked nodes (step 2240). The operation then terminates.

The code generation transformation algorithm applied in step 2240 may be of the type shown in FIG. 11, described previously. An alternative code generation transformation algorithm may be as shown in the following pseudocode where AST refers to the program loop view of the source code currently undergoing the code generation optimizations:

```
ApplyCodegenTransformation: applies a transformation on AST
    Input :
        node: AST, where the nodes that initiate a transformation are marked.
        outer_visitor_type: method that order the nodes of the AST according to its
definition (e.g. depth first search, ...)
        apply_core_function: method to be applied on the marked node
        propagate_changes: method to be applied on the children below a marked node
    Output : transformed AST
        visitor = new visitor(outer_visitor_type, root of AST)
        for each currentNode in visitor, according to the order defined by the
outer_visitor_type
            if currentNode is marked
                boolean changed = false
1               core_node_list = apply_core_function(currentNode, changed)
                if changed
                    sort core_node_list under parent context
                    foreach newNode in core_node_list, accorind to the sorted order
2                       newNode.children = a replicate copy of currentNode.children
3                       newNode = propagate_changes(newNode.children)
                        if newNode.children size is 0
4                           delete newNode
    return transformed AST
```

It should be appreciated that with the application of the code generation transformation algorithm of the illustrative embodiments, rather than having to apply code generation optimizations to the program loop view as a whole, i.e. at only the root of the program loop view, or at all of the nodes at the same depth as a whole, the mechanisms of the illustrative embodiments allow the code generation optimizations to be applied to individual arbitrary sets of one or more nodes in the program loop view.

Figure 23:
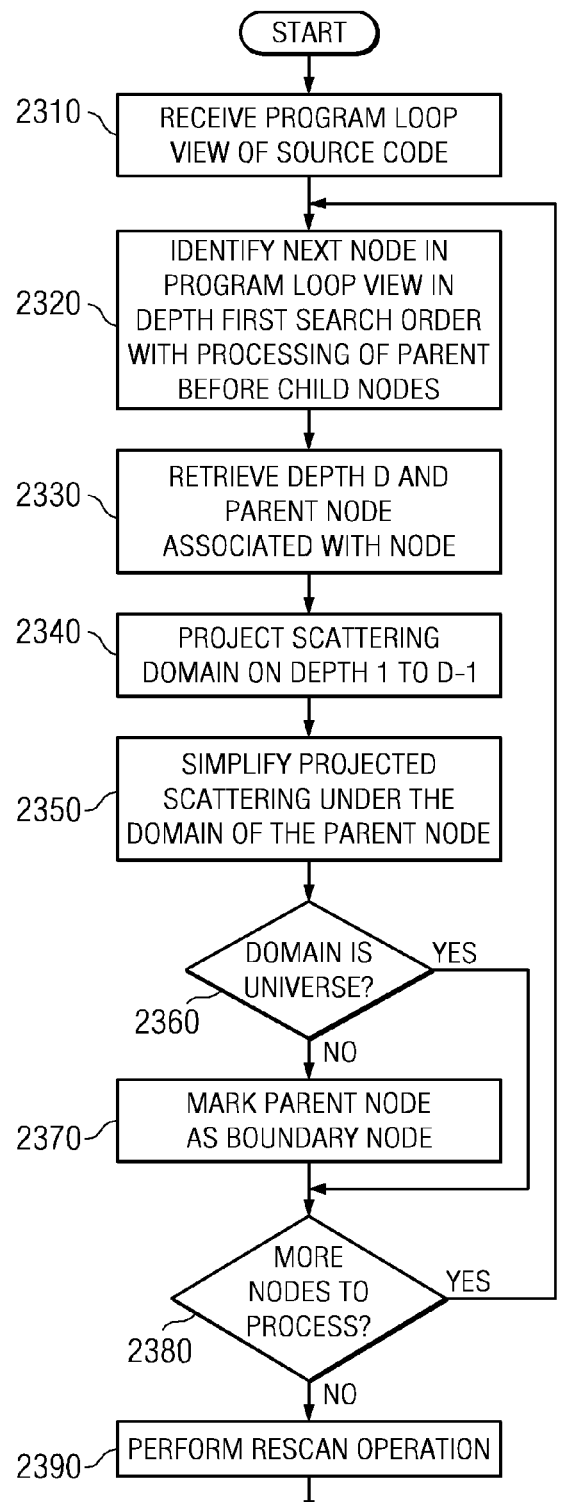
FIG. 23 is a flowchart outlining an exemplary operation for preserving stability of code in the presence of conditionals for re-entrance in accordance with one illustrative embodiment.

FIG. 23 is a flowchart outlining an exemplary operation for preserving stability of code in the presence of conditionals for re-entrance in accordance with one illustrative embodiment. The operation outlined in FIG. 23 may be performed, for example, as part of step 2130 in FIG. 21 to ensure stability of the code, i.e. minimizing growth of the code or code bloat.

As shown in FIG. 23, the operation starts with receiving the program lop view of the source code (step 2310). A next node in the program loop view is identified in a depth first search order with processing of parent nodes before child nodes (step 2320). The depth d of the node is retrieved and the immediate parent of the node is identified (step 2330). The scattering domain for the node is projected on a depth of 1 to d−1 (step 2340) and the projected scattering is simplified under the domain of the parent node (step 2350). A determination is made as to whether the domain is the universe (step 2360). Stating that a domain is the universe is equivalent to stating that the domain corresponds to the entire space with no constraints. For example, in the one dimensional space of integer or entire numbers, a domain formed by the two constrains "x>−5 and x<10" is not the universe as it has constrains. However, if a domain with no constrains is the universe, it includes any possible integer numbers, from minus infinity to plus infinity. If the domain is not the universe, then the parent node is marked as a boundary node (step 2370).

Thereafter, or if the node is the universe, a determination is made as to whether more nodes are present that need to be processed (step 2380). If so, the operation returns to step 2320 and repeats with the next node. If no more nodes are to be processed, the operation performs a rescan operation (step 2390) such as in step 2130 of FIG. 21. The operation then terminates.

Figure 24:
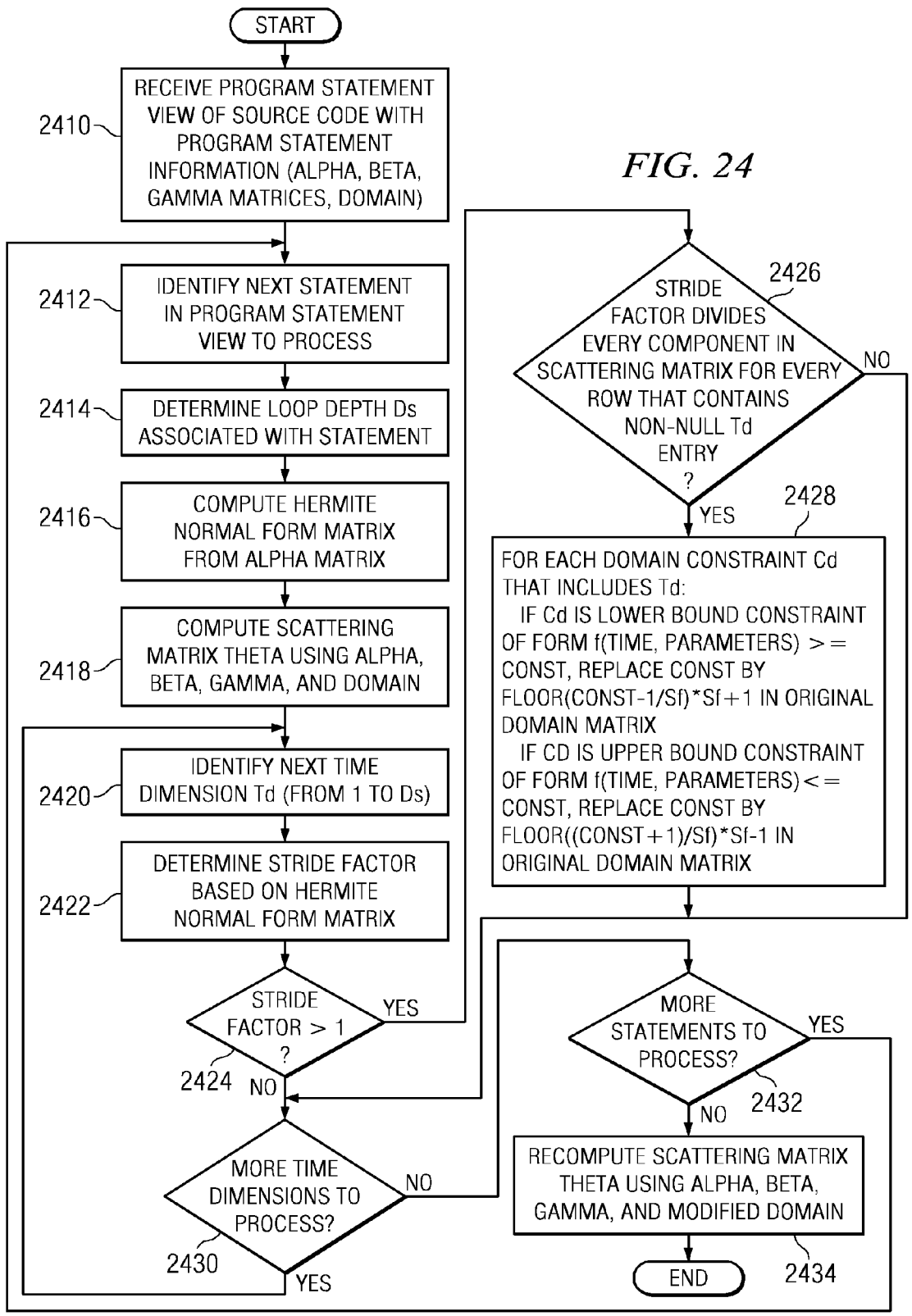
FIG. 24 is a flowchart outlining an exemplary operation for performing scatter domain stretching in accordance with one illustrative embodiment.

FIG. 24 is a flowchart outlining an exemplary operation for performing scatter domain stretching in accordance with one illustrative embodiment. As shown in FIG. 24, the operation starts with receiving the program statement view of the source code with the program statement information for the various statements (step 2410). A next statement in the program statement view to process is identified (step 2412) and a loop depth Ds of the statement is determined (step 2414). The Hermite Normal Form (HNF) matrix for the statement is computed from the Alpha matrix of the statement (step 2416). The scattering matrix Theta for the statement is computed using the Alpha, Beta, and Gamma matrices and the Domain of the statement (step 2418).

A next time dimension to be processed is identified (step 2420). A stride factor for that time dimension is determined based on the HNF matrix (step 2422). A determination is made as to whether the stride factor is greater than one (step 2424). If the stride factor is greater than one, then a determination is made as to whether the stride factor divides every component in the scattering matrix for every row that contains a non-null time dimension entry Td (step 2426). If so, then for each domain constraint Cd that includes the time dimension entry Td, if Cd is a lower bound constraint of the form f(time, parameters)>=const, then const is replaced by floor(const−1/Sf)*Sf+1 in the original domain matrix, where Sf is the scatter factor. If Cd is an upper bound constraint of the form f(time, parameters)<=const, then const is replaced by floor((const+1)/Sf)*Sf−1 in the original domain matrix (step 2428).

Thereafter, or if the stride factor does not divide every component in the scattering matrix (step 2426), or if the stride factor is less than or equal to 1, then a determination is made as to whether there are additional time dimensions to process (step 2430). If there are additional time dimensions to process, the operation returns to step 2420 and proceeds with the next time dimension. If there are no additional time dimensions to process, the operation determines if there are more statements to process (step 2432). If there are more statements to process, the operation returns to step 2412 and proceeds with the next statement. If there are no more statements to process, then the scattering matrix Theta is recomputed using the Alpha, Beta, and Gamma matrices and the modified domain (step 2434). The operation then terminates.

Again, this invention is not constrained to a particular representation of the schedule (the Alpha/Beta/Gamma matrices here). While they are used in the above embodiments, other alternative representations can be used in the illustrative embodiments without departing from the spirit and scope of the present invention, as discussed above.

Thus, the illustrative embodiments provide a mechanism for optimizing source code that permits individual statement instances within a program loop view of the source code to be operated upon by code generation optimizations and loop optimizations. A re-entrance path is provided through which the code may undergo optimizations in an iterative manner.

The re-entrance path allows a program loop view of the code to be transformed back into a program statement view so that program loop optimizations may be applied to the program statement view after code generation optimizations have been applied to the previous program loop view. Moreover, mechanisms are provided for ensuring the stability of the code when traversing the re-entrance path by projecting and simplifying scattering domains, performing polyhedral rescans of the code based on such scattering domains, and minimizing code bloat.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for optimizing program code, comprising:
receiving source code for a program in a compiler executed by at least one processor of the data processing system;
transforming, by the at least one processor, the source code into a first program statement view of the source code;
transforming, by the at least one processor, the first program statement view of the source code into a program loop view of the source code;
applying, by the at least one processor, one or more code generation optimizations to the program loop view of the source code to generate first optimized code;
generating, by a polyhedral rescan module of a re-entrance path executed by the at least one processor, a second program statement view of the source code based on the first optimized code and information maintained for each statement in the first program statement view, describing how the source code was transformed into the first program statement view;
generating, by the at least one processor, second optimized code based on the second program statement view of the source code; and
outputting, by the at least one processor, optimized code, based on the second optimized code, to the compiler for use in generating executable code for execution on a computing device, wherein generating the second program statement view via the re-entrance path comprises recombining instances of statements in the program loop view prior to a polyhedral rescan operation of the re-entrance path being performed on the program loop view of the source code.

2. The method of claim 1, wherein the program loop view of the source code is a hierarchical ordered graph of the source code where each inner node of the graph corresponds to an iteration domain at a given depth in a loop nest structure, and wherein each leaf node of the graph has a list of statements that are enclosed by a loop nest corresponding to the leaf node.

3. The method of claim 2, wherein each node in the graph is associated with a domain, and wherein each domain is a polyhedral representation of a domain associated with statements enclosed by the node and projected to reflect a depth of the node within the graph.

4. The method of claim 1, wherein, each statement in the first program statement view has an associated schedule data structure, and wherein the schedule data structure is maintained and stored in association with corresponding statements in the program loop view of the source code.

5. The method of claim 1, further comprising:
detecting, in the program loop view of the source code, nodes containing hoistable conditional statements;
marking a parent node as a boundary node for a re-entrance operation;
identifying for each marked boundary node of a given depth in the program loop view of the source code, all instances of a given statement; and
generating, in the first optimized code, a single compound statement representing all of the instances of the given statement at the given depth in the program loop view of the source code.

6. The method of claim 5, further comprising:
setting a new domain for the compound statement as a union of domains over all instances of the given statement.

7. The method of claim 1, wherein the first program statement view of the source code is a representation of the source code in which each statement in the source code is associated with a polyhedron describing a domain of the statement identifying a number of times the statement iterates in each loop dimension, and a schedule of the statement identifying when the statement is executed relative to the other statements in the source code, wherein the schedule is specified as a structured matrix, and wherein the program loop view organizes statements in the first program statement view into groups of statements according to iterations of loops with which the statements correspond such that at least one instance of a statement in the first program statement view is separated into a plurality of instances of the statement, one for each group of statements corresponding to iterations of loops.

8. The method of claim 1, wherein each instance of a same statement in the program loop view has a separate sub-domain of a domain associated with a corresponding statement in the first program statement view, and separate schedule, and wherein as part of processing according to the re-entrance path, each of the instances of a same statement in the program loop view is operated on separately with regard to optimizations applied to the statements.

9. A computer program product comprising a computer readable storage medium having a computer readable program stored thereon, wherein the computer readable program, when executed on a computing device, causes the computing device to:
receive source code for a program in a compiler;
transform the source code into a first program statement view of the source code;
transform the first program statement view of the source code into a program loop view of the source code;
apply one or more code generation optimizations to the program loop view of the source code to generate first optimized code;
generate, by a polyhedral rescan module of a re-entrance path, a second program statement view of the source code based on the first optimized code and information maintained for each statement in the first program statement view, describing how the source code was transformed into the first program statement view;
generate second optimized code based on the second program statement view of the source code; and
output optimized code, based on the second optimized code, to the compiler for use in generating executable code for execution on a computing device, wherein generating the second program statement view via the re-entrance path comprises recombining instances of statements in the program loop view prior to a polyhedral rescan operation of the re-entrance path being performed on the program loop view of the source code.

10. The computer program product of claim 9, wherein the program loop view of the source code is a hierarchical ordered graph of the source code where each inner node of the graph corresponds to an iteration domain at a given depth in a loop nest structure, and wherein each leaf node of the graph has a list of statements that are enclosed by a loop nest corresponding to the leaf node.

11. The computer program product of claim 10, wherein each node in the graph is associated with a domain, and wherein each domain is a polyhedral representation of a domain associated with statements enclosed by the node and projected to reflect a depth of the node within the graph.

12. The computer program product of claim 9, wherein, each statement in the first program statement view has an associated schedule data structure, and wherein the schedule data structure is maintained and stored in association with corresponding statements in the program loop view of the source code.

13. The computer program product of claim 9, wherein the computer readable program further causes the computing device to:
- detect, in the program loop view of the source code, nodes containing hoistable conditional statements;
- mark a parent node as a boundary node for a re-entrance operation;
- identify for each marked boundary node of a given depth in the program loop view of the source code, all instances of a given statement; and
- generate, in the first optimized code, a single compound statement representing all of the instances of the given statement at the given depth in the program loop view of the source code.

14. The computer program product of claim 13, wherein the computer readable program further causes the computing device to:
- set a new domain for the compound statement as a union of domains over all instances of the given statement.

15. A system, comprising:
- a processor; and
- a memory coupled to the processor, wherein the memory comprises instructions which, when executed by the processor, cause the processor to:
- receive source code for a program in a compiler;
- transform the source code into a first program statement view of the source code;
- transform the first program statement view of the source code into a program loop view of the source code;
- apply one or more code generation optimizations to the program loop view of the source code to generate first optimized code;
- generate, by a polyhedral rescan module of a re-entrance path, a second program statement view of the source code based on the first optimized code and information maintained for each statement in the first program statement view, describing how the source code was transformed into the first program statement view;
- generate second optimized code based on the second program statement view of the source code; and
- output optimized code, based on the second optimized code, to the compiler for use in generating executable code for execution on a computing device, wherein generating the second program statement view via the re-entrance path comprises recombining instances of statements in the program loop view prior to a polyhedral rescan operation of the re-entrance path being performed on the program loop view of the source code.

16. The system of claim 15, wherein the program loop view of the source code is a hierarchical ordered graph of the source code where each inner node of the graph corresponds to an iteration domain at a given depth in a loop nest structure, and wherein each leaf node of the graph has a list of statements that are enclosed by a loop nest corresponding to the leaf node.

17. The system of claim 16, wherein each node in the graph is associated with a domain, and wherein each domain is a polyhedral representation of a domain associated with statements enclosed by the node and projected to reflect a depth of the node within the graph.

18. The system of claim 15, wherein, each statement in the first program statement view has an associated schedule data structure, and wherein the schedule data structure is maintained and stored in association with corresponding statements in the program loop view of the source code.

19. The system of claim 15, wherein the instructions further cause the processor to:
- detect, in the program loop view of the source code, nodes containing hoistable conditional statements;
- mark a parent node as a boundary node for a re-entrance operation;
- identify for each marked boundary node of a given depth in the program loop view of the source code, all instances of a given statement; and
- generate, in the first optimized code, a single compound statement representing all of the instances of the given statement at the given depth in the program loop view of the source code.

20. The system of claim 19, wherein the instructions further cause the processor to:
- set a new domain for the compound statement as a union of domains over all instances of the given statement.

* * * * *